United States Patent
Zhamu et al.

(10) Patent No.: US 10,584,216 B2
(45) Date of Patent: *Mar. 10, 2020

(54) PROCESS FOR PRODUCING HUMIC ACID-DERIVED CONDUCTIVE FOAMS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/251,849

(22) Filed: Aug. 30, 2016

(65) Prior Publication Data

US 2018/0057360 A1    Mar. 1, 2018

(51) Int. Cl.
    *C08J 9/00* (2006.01)
    *C08H 7/00* (2011.01)
    (Continued)

(52) U.S. Cl.
    CPC ............. *C08H 6/00* (2013.01); *C01B 32/184* (2017.08); *C01B 32/19* (2017.08); *C08J 9/02* (2013.01);
    (Continued)

(58) Field of Classification Search
    CPC ....... H01M 4/00; H01M 10/00; Y10T 428/00; C01B 31/00; B82Y 40/00; C08H 6/00; H01G 11/00
    See application file for complete search history.

(56) References Cited

U.S. PATENT DOCUMENTS 5,688,999 A    11/1997   Lebo et al.
6,872,330 B2    3/2005   Mack et al.
(Continued)

FOREIGN PATENT DOCUMENTS

CN    1230972 A    10/1999
CN    103641117 A    3/2014
(Continued)

OTHER PUBLICATIONS

"Humic Acid-Derived Mesoporous Carbon as Cathode Component for Lithium-Sulfur Battery", P. Pólrolniczak, K. Wasinski, M. Walkowiak, Int. J. Electrochem. Sci., 10 (2015) pp. 9370-9378.*
(Continued)

*Primary Examiner* — Gordon Baldwin
*Assistant Examiner* — Mohammad Mayy

(57) ABSTRACT

A process for producing a humic acid (HA)-derived foam, comprising: (a) preparing a HA dispersion having multiple HA molecules and an optional blowing agent dispersed in a liquid medium having a blowing agent-to-HA weight ratio from 0/1.0 to 1.0/1.0; (b) dispensing and depositing the HA dispersion onto a surface of a supporting substrate to form a wet HA layer; (c) partially or completely removing liquid medium from the wet HA layer to form a dried HA layer; and (d) heat treating the dried HA layer at a first heat treatment temperature from 80° C. to 3,200° C. at a desired heating rate sufficient to induce volatile gas molecules from the non-carbon elements or to activate the blowing agent for producing the HA-derived foam.

18 Claims, 11 Drawing Sheets

(51) Int. Cl.
  *C08J 9/10* (2006.01)
  *C01B 32/184* (2017.01)
  *C08J 9/02* (2006.01)
  *C01B 32/19* (2017.01)
  *C08L 97/00* (2006.01)

(52) U.S. Cl.
  CPC .............. *C08J 9/103* (2013.01); *C08L 97/002* (2013.01); *C01P 2006/10* (2013.01); *C01P 2006/12* (2013.01); *C01P 2006/32* (2013.01); *C01P 2006/40* (2013.01); *C08J 2203/04* (2013.01); *C08J 2205/042* (2013.01); *C08J 2205/044* (2013.01); *C08J 2399/00* (2013.01)

(56) References Cited

U.S. PATENT DOCUMENTS

| | | |
|---|---|---|
| 6,913,154 B2 | 7/2005 | Koslow |
| 7,071,258 B1 | 7/2006 | Jang et al. |
| 7,327,000 B2 | 2/2008 | DeHeer et al. |
| 7,623,340 B1 | 11/2009 | Song et al. |
| 7,758,842 B2 | 7/2010 | Nishikawa et al. |
| 7,948,739 B2 | 5/2011 | Zhamu et al. |
| 8,105,565 B2 | 1/2012 | Nishikawa et al. |
| 9,053,870 B2 | 6/2015 | Yu et al. |
| 9,233,850 B2 | 1/2016 | Jang et al. |
| 2005/0271574 A1 | 12/2005 | Jang et al. |
| 2008/0048152 A1 | 2/2008 | Jang et al. |
| 2008/0248275 A1 | 10/2008 | Jang et al. |
| 2009/0061312 A1 | 3/2009 | Zhamu et al. |
| 2009/0095942 A1 | 4/2009 | Yamaguchi et al. |
| 2010/0021819 A1 | 1/2010 | Zhamu et al. |
| 2010/0085713 A1 | 4/2010 | Balandin et al. |
| 2010/0140792 A1 | 6/2010 | Haddon et al. |
| 2011/0108978 A1 | 5/2011 | Kim et al. |
| 2011/0165321 A1* | 7/2011 | Zhamu .................. B82Y 30/00 427/79 |
| 2011/0201739 A1* | 8/2011 | Beall ...................... B82Y 30/00 524/325 |
| 2011/0243830 A1 | 10/2011 | Ozaki et al. |
| 2012/0021250 A1 | 1/2012 | Lee et al. |
| 2013/0095389 A1 | 4/2013 | Bhardwaj et al. |
| 2013/0112925 A1 | 5/2013 | Beall |
| 2013/0141774 A1 | 6/2013 | McCarthy |
| 2014/0030636 A1 | 1/2014 | Zhao et al. |
| 2014/0110049 A1 | 4/2014 | Yuen et al. |
| 2014/0335420 A1 | 11/2014 | Yamamoto et al. |
| 2015/0044364 A1 | 2/2015 | Katayama et al. |
| 2015/0086881 A1 | 3/2015 | Zhamu et al. |
| 2015/0118554 A1 | 4/2015 | Wu et al. |
| 2015/0218003 A1* | 8/2015 | Zhamu ................. C01B 31/0476 428/220 |
| 2015/0259212 A1 | 9/2015 | Li et al. |
| 2016/0043384 A1 | 2/2016 | Zhamu et al. |

FOREIGN PATENT DOCUMENTS

| | | | | |
|---|---|---|---|---|
| CN | 104600320 A | | 5/2015 | |
| CN | 103752281 B | | 4/2016 | |
| CN | 104900876 B | | 5/2017 | |
| GB | 317496 A | * | 8/1929 | ............ C08L 95/005 |
| JP | 58117649 | | 7/1983 | |
| WO | 2012151880 A1 | | 11/2012 | |

OTHER PUBLICATIONS

"Statistical evaluation of the elemental composition of humic substances", James a. Rice and Patrick MacCarthy, Org.Geochem. vol. 17, No. 5, pp. 635-648, 1991.*
"Reduced humic acid nanosheets and its uses as nanofiller", Elshazly M.Duraia, B.Henderson, Gary W.Beall, Journal of Physics and Chemistry of Solids 85 (2015) 86-90.*
"Formation and degradation of a synthetic humic acid derived from 3-˜uorocatechol", U. Wunderwald, G. Kreisel, M. Braun, M. Schulz, C. Jager, M. Hofrichter, Appl Microbiol Biotechnol 53: 441-446. (Year: 2000).*
PCT/US17/43494, International Search Report and Written Opinion, dated Sep. 27, 2017, 15 pages.
Powell et al., "Graphene Oxide and graphene from low grade coal: Synthesis, characterization and applications" Current Opinion in Colloid & Interface Science (2015) vol. 20, No. 5, pp. 362, 365-366.
Wunderwald et al., "Formation and degradation of a synthetic humic acid derived from 3-fluorocatechol" Applied Microbiology and Biotechnology (2000) vol. 53, No. 4, p. 441.
Bor Z. Jang and A. Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Y. Xu, et al. "Self-Assembled Graphene Hydrogel via a One-Step Hydrothermal Process," ACS Nano 2010, 4, 4324-4330.
Zongping Chen, et al., "Three-dimensional flexible and conductive interconnected graphene networks grown by chemical vapour deposition," Nature Materials, 10 (Jun. 2011) 424-428.
B. G. Choi, et al., "3D Macroporous Graphene Frameworks for Supercapacitors with High Energy and Power Densities," ACS Nano, 6 (2012) 4020-4028.
Li Wang, Xiangming He, Jianjun Li, Jian Gao, Mau Fang, Guangyu Tian, Jianlong Wang, Shoushan Fan, "Graphene-coated plastic film as current collector for lithium/sulfur batteries," J. Power Source, 239 (2013) 623-627.
S.J. Richard Prabakar, Yun-Hwa Hwang, Eun Gyoung Bae, Dong Kyu Lee, Myoungho Pyo, "Graphene oxide as a corrosion inhibitor for the aluminum current collector in lithium ion batteries," Carbon, 52 (2013) 128-136.
Gwon, H.; Kim, H-S; Lee, KE; Seo, D-H; Park, YC; Lee, Y-S; Ahn, BT; Kang, K "Flexible energy storage devices based on graphene paper," Energy and Environmental Science. 4 (2011) 1277-1283.
CN 103641117a, Google Patent English language translation, 5 pages.
CN 103752281B, Google Patent English language translation, 8 pages.
CN 104600320A Google Patent English Translation, 6 pages.
CN 1230972A, Google Patents English language translation, 22 pages.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
PCT/US17/18708 International Search Report and Written Opinion dated Jun. 6, 2017, 12 pages.
PCT/US17/36032 International Search Report and Written Opinion dated Aug. 25, 2017, 11 pages.
Porada et al., "Review on the science and technology of water desalination by capacitive deionization" Progress in Materials Science (2013) vol. 58, pp. 1388-1442.
U.S. Appl. No. 15/243,589 Nonfinal Office Action dated Nov. 16, 2017, 8 pages.
U.S. Appl. No. 15/243,589 Response Nonfinal Office Action dated Nov. 22, 2017, 11 pages.
U.S. Appl. No. 15/270,868 Nonfinal Office Action dated Nov. 1, 2017, 23 pages.
Xu et al., "Self-Assembled Graphene Hydrogel via a One-Step Hydrothermal Process" ACS Nano (2010) vol. 4, No. 7, pp. 4324-4330.
Yang et al., "Two-dimensional Graphene Nano-ribbons" J. Am. Chem. Soc. (2008) vol. 130, pp. 4216-4217.
Stevenson, Humus Chemistry: Genesis, Composition, Reactions (1982) pp. 258-263, John Wiley & Sons, New York.
Duraia et al., "Reduced humic acid nanosheets and its uses as nanofiller" J. Phys. Chem. Solids (2015) vol. 85, pp. 86-90.

* cited by examiner

PROCESS FOR PRODUCING HUMIC ACID-DERIVED CONDUCTIVE FOAMS

FIELD OF THE INVENTION

The present invention relates generally to the field of carbon/graphite foams and, more particularly, to a new form of conductive foam derived from humic acid, devices containing such a humic acid-derived foam, and the process for producing same.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). Other than fullerene, all these materials can be made into a foamed structure.

The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material. However, CNTs are difficult to produce and are extremely expensive. Further, CNTs are known to be difficult to disperse in a solvent or water and difficult to mix with other materials. These characteristics have severely limited their scope of application.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), and graphene oxide (≥5% by weight of oxygen).

NGPs have been found to have a range of unusual physical, chemical, and mechanical properties. Our research group was the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were previously reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphene Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni-C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a new class of carbon nano materials that are comparable or superior to graphene in terms of properties, but can be produced more cost-effectively, faster, more scalable, and in a more environmentally benign manner. The production process for such a new carbon nano material requires a reduced amount of undesirable chemical (or elimination of these chemicals all together), shortened process time, less energy consumption, reduced or eliminated effluents of undesirable chemical species into the drainage (e.g., sulfuric acid) or into the air (e.g., $SO_2$ and $NO_2$). Furthermore, one should be able to readily make this new nano material into a foam structure that is relatively conductive thermally and electrically.

Generally speaking, a foam or foamed material is composed of pores (or cells) and pore walls (a solid material). The pores can be interconnected to form an open-cell foam. As an example, graphene foam is composed of pores and pore walls that contain a graphene material. There are three major methods of producing graphene foams, which are all tedious, energy-intensive, and slow:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores [B. G. Choi, et al., "3D Macroporous Graphene Frameworks for Supercapacitors with High Energy and Power Densities," ACS Nano, 6 (2012) 4020-4028.]. Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene and graphene foams has major deficiencies. Thus, it is an object of the present invention to provide a new class of foam material that is thermally and electrically conducting and mechanically robust and to provide a cost-effective method of producing this class of foam.

Humic acid (HA) is an organic matter commonly found in soil and can be extracted from the soil using a base (e.g. KOH). HA can also be extracted, with a high yield, from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon and hydrogen). HA, after chemical or thermal reduction, has an oxygen content of 0.01% to 5% by weight. For claim definition purposes in the instant application, humic acid (HA) refers to the entire oxygen content range, from 0.01% to 42% by weight. The reduced humic acid (RHA) is a special type of HA that has an oxygen content of 0.01% to 5% by weight.

The present invention is directed at a new class of graphene-like 2D materials (i.e. humic acid) that surprisingly can be converted into a foamed structure of high structural integrity. Thus, another object is to provide a cost-effective process for producing such a nano carbon foam (specifically, humic acid-derived foam) in large quantities. This process does not involve the use of an environmentally unfriendly chemical. This method enables the flexible design and control of the porosity level and pore sizes.

It is another object of the present invention to provide a humic acid-derived foam that exhibits a thermal conductivity, electrical conductivity, elastic modulus, and/or strength comparable to or greater than those of the conventional graphite foams, carbon foams, or graphene foams. Yet another object of the present invention is to provide a humic acid-derived foam that preferably has a meso-scaled pore size range (2-50 nm).

Another object of the present invention is to provide products (e.g. devices) that contain a humic acid-derived foam of the present invention and methods of operating these products.

SUMMARY OF THE INVENTION

The present invention provides a humic acid-derived foam composed of multiple pores and pore walls, wherein the pore walls contain single-layer or few-layer humic acid-derived hexagonal carbon sheets and the few-layer hexagonal carbon sheets have 2-10 stacked hexagonal carbon atomic planes having an inter-plane spacing $d_{002}$ from 0.3354 nm to 0.60 nm (preferably no greater than 0.40 nm) as measured by X-ray diffraction. The single-layer or few-layer hexagonal carbon sheets contain 0.01% to 25% by weight of non-carbon elements. The humic acid (HA) is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof.

The humic acid-derived foam herein invented can be divided into three types: (a) humic acid (HA) foams that contain at least 10% by weight (typically from 10% to 42% by weight and most typically from 10% to 25%) of non-carbon elements that can be used for a broad array of applications (wherein the original humic acid molecules remain substantially the same, but some chemical linking between HA molecules has occurred); (b) a chemically merged and reduced humic acid-based foam wherein extensive linking and merging between original HA molecules has occurred to form incipient graphene-like hexagonal carbon sheets constituting pore walls, resulting in evolution of chemical species containing non-carbon elements originally attached to HA molecules (hence, non-carbon element content reduced to generally between 2% and 10% by wt.); and (c) humic acid-derived graphitic foam that contains essentially all carbon only (<2% by weight of non-carbon content, preferably <1%, and further preferably <0.1%), wherein the pore walls contain single-layer or few-layer (2-10) graphene-like sheets that are hexagonal carbon atomic planes.

Preferably and typically, the HA-derived foam has a density from 0.005 to 1.7 g/cm³, a specific surface area from 50 to 3,200 m²/g, a thermal conductivity of at least 100 W/mK per unit of specific gravity, and/or an electrical conductivity no less than 500 S/cm per unit of specific gravity. More typically, the humic acid-derived foam has a density from 0.01 to 1.5 g/cm³ or an average pore size from 2 nm to 50 nm. In an embodiment, the foam has a specific surface area from 200 to 2,000 m²/g or a density from 0.1 to 1.3 g/cm³.

Typically, if the HA-derived foam is produced from a process that does not contain a heat treatment temperature (HTT) higher than 300° C., the foam has a content of non-carbon elements in the range of 10% to 42% by weight. The pore walls can still contain identifiable humic acid molecules that are sheet-like hexagonal carbon atomic structures. The non-carbon elements can include an element selected from oxygen, fluorine, chlorine, bromine, iodine, nitrogen, hydrogen, or boron. In a specific embodiment, the pore walls contain fluorinated humic acid and the foam contains a fluorine content from 0.01% to 25% by weight. In another embodiment, the foam contains an oxygen content from 0.01% to 25% by weight.

With a HTT higher than 300° C., neighboring HA molecules that are closely packed and well-aligned can be chemically linked together to form multi-ring aromatic structures that resemble incipient graphene-like hexagonal carbon atomic structures. As heat treatment continues, these highly aromatic molecules are merged together in an edge-to-edge manner to increase the length and width of graphene-like hexagonal planes and, concurrently, several hexagonal carbon planes can be stacked together to form multi-layer carbon atomic structures, similar to few-layer graphene structures. The inter-planar spacing is typically reduced to <<0.60 nm, more typically <0.40 nm. If the HTT is from 300° C. up to 1,500° C., one typically produces chemically merged and reduced humic acid-based foam, wherein extensive linking and merging between original HA molecules has occurred to form incipient graphene-like hexagonal carbon sheets that constitute pore walls. The non-carbon content in the foam is typically reduced to from 2% to 10%.

If the HTT is from 1,500° C. to 3,200° C. and the foam can become essentially a graphitic foam wherein the pore walls contain single-layer or few-layer graphene-like hexagonal carbon planes and the non-carbon content is reduced to less than 2% by wt.

In a preferred embodiment, the foam is made into a continuous-length roll sheet form (a roll of a continuous foam sheet) having a thickness no greater than 200 µm and a length of at least 1 meter long, preferably at least 2 meters, further preferably at least 10 meters, and most preferably at least 100 meters. This sheet roll is produced by a roll-to-roll process. There has been no prior art HA-derived graphene-like foam that is made into a sheet roll form.

In a preferred embodiment, the HA-derived foam has an oxygen content or non-carbon content less than 1% by weight, and the pore walls have stacked graphene-like planes having an inter-planar spacing less than 0.35 nm, a thermal conductivity of at least 200 W/mK per unit of specific gravity, and/or an electrical conductivity no less than 1,000 S/cm per unit of specific gravity.

In a further preferred embodiment, the HA-derived foam has an oxygen content or non-carbon content less than 0.1% by weight and said pore walls contain stacked graphene-like hexagonal carbon atomic planes having an inter-planar spacing less than 0.34 nm, a thermal conductivity of at least 250 W/mK per unit of specific gravity, and/or an electrical conductivity no less than 1,500 S/cm per unit of specific gravity.

In yet another preferred embodiment, the graphene foam has an oxygen content or non-carbon content no greater than 0.01% by weight and said pore walls contain stacked graphene-like planes having an inter-graphene spacing less than 0.336 nm, a mosaic spread value no greater than 0.7, a thermal conductivity of at least 300 W/mK per unit of specific gravity, and/or an electrical conductivity no less than 2,000 S/cm per unit of specific gravity.

In still another preferred embodiment, the graphene foam has pore walls containing stacked graphene-like atomic planes having an inter-planar spacing less than 0.336 nm, a mosaic spread value no greater than 0.4, a thermal conductivity greater than 400 W/mK per unit of specific gravity, and/or an electrical conductivity greater than 3,000 S/cm per unit of specific gravity.

In a preferred embodiment, the pore walls contain stacked graphene-like hexagonal carbon atomic planes having an inter-planar spacing less than 0.337 nm and a mosaic spread value less than 1.0. In a preferred embodiment, the foam exhibits a degree of graphitization no less than 80% (preferably no less than 90%) and/or a mosaic spread value less than 0.4. In a preferred embodiment, the pore walls contain a 3D network of interconnected graphene-like hexagonal carbon atomic planes.

In a preferred embodiment, the solid foam contains meso-scaled pores having a pore size from 2 nm to 50 nm. The solid foam can also be made to contain micron-scaled pores (1-500 µn).

The presently invented HA-derived foam may be produced by a process comprising: (a) preparing a humic acid dispersion having multiple humic acid molecules or sheets dispersed in a liquid medium, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) dispensing and depositing the graphene dispersion onto a surface of a supporting substrate (e.g. plastic film, rubber sheet, metal foil, glass sheet, paper sheet, etc.) to form a wet layer of humic acid; (c) partially or completely removing the liquid medium from the wet layer of humic acid to form a dried layer of humic acid; and (d) heat treating the dried layer of humic acid at a first heat treatment temperature from 80° C. to 3,200° C. at a desired heating rate sufficient to induce formation and releasing of volatile gas molecules from the non-carbon elements (e.g. O, H, N, B, F, Cl, Br, I, etc.) or to activate the blowing agent for producing humic acid-derived foam. Preferably, the dispensing and depositing procedure includes subjecting the humic acid dispersion to an orientation-inducing stress.

This optional blowing agent is not required if the HA material has a content of non-carbon elements (e.g. O, H, N, B, F, Cl, Br, I, etc.) no less than 5% by weight (preferably no less than 10%, further preferably no less than 20%, even more preferably no less than 30%). The subsequent high temperature treatment serves to remove a majority of these non-carbon elements from the edges of HA molecules, generating volatile gas species that produce pores or cells in the solid foam structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content in the humic acid is less than 5%.

The blowing agent can be a physical blowing agent, a chemical blowing agent, a mixture thereof, a dissolution-and-leaching agent, or a mechanically introduced blowing agent.

The process may further include a step of heat-treating the solid foam at a second heat treatment temperature higher than the first heat treatment temperature for a length of time sufficient for obtaining a graphene-like foam wherein the pore walls contain stacked hexagonal carbon atomic planes having an inter-planar spacing $d_{002}$ from 0.3354 nm to 0.40 nm and a content of non-carbon elements less than 5% by weight (typically from 0.001% to 2%). When the resulting non-carbon element content is from 0.1% to 2.0%, the inter-plane spacing $d_{002}$ is typically from 0.337 nm to 0.40 nm.

If the original HA molecules in the dispersion contains a non-carbon element content higher than 5% by weight, the hexagonal carbon atomic planes in the solid foam (after the heat treatment) contain structural defects that are induced during the step (d) of heat treating. The liquid medium can be simply water and/or an alcohol, which is environmentally benign.

In a preferred embodiment, the process is a roll-to-roll process wherein steps (b) and (c) include feeding the supporting substrate from a feeder roller to a deposition zone, continuously or intermittently depositing the HA dispersion onto a surface of the supporting substrate to form the wet layer of HA material thereon, drying the wet layer of HA material to form the dried layer of HA material, and collecting the dried layer of HA material deposited on the supporting substrate on a collector roller. Such a roll-to-roll or reel-to-reel process is a truly industrial-scale, massive manufacturing process that can be automated.

In one embodiment, the first heat treatment temperature is from 100° C. to 1,500° C. In another embodiment, the second heat treatment temperature includes at least a temperature selected from (A) 300-1,500° C., (B) 1,500-2,100° C., and/or (C) 2,100-3,200° C. In a specific embodiment, the second heat treatment temperature includes a temperature in the range of 300-1,500° C. for at least 1 hour and then a temperature in the range of 1,500-3,200° C. for at least 1 hour.

There are several surprising results of conducting first and/or second heat treatments to the dried HA layer, and different heat treatment temperature ranges enable us to achieve different purposes, such as (a) removal of non-carbon elements from the HA material (e.g. thermal reduction of fluorinated humic acid to obtain reduced humic acid) which generate volatile gases to produce pores or cells in the HA foam, (b) activation of the chemical or physical blowing agent to produce pores or cells, (c) chemical linking or merging of humic acid molecules into highly aromatic molecules and edge-to-edge merging of aromatic ring structures or hexagonal carbon planes to significantly increase the lateral dimensions (length and width) of graphene-like hexagonal carbon sheets in the foam walls (solid portion of the foam), (d) healing of defects naturally existing in HA or created during fluorination, oxidation, or nitrogenation of humic acid molecules, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between sheet-like HA molecules, often in an edge-to-edge manner (some in face-to-face manner).

In one embodiment, the HA-derived foam has a specific surface area from 200 to 2,000 $m^2/g$. In one embodiment, the solid foam has a density from 0.1 to 1.5 $g/cm^3$. In an embodiment, step (d) of heat treating the layer of HA material at a first heat treatment temperature is conducted under a compressive stress. In another embodiment, the process comprises a compression step to reduce a thickness, pore size, or porosity level of the film of HA-derived foam. In some applications, the foam has a thickness no greater than 200 μm.

In an embodiment, the HA dispersion has at least 5% by weight of HA dispersed in the liquid medium to form a liquid crystal phase. In an embodiment, the first heat treatment temperature contains a temperature in the range of 80° C.-300° C. and, as a result, the HA foam has an oxygen content or non-carbon element content less than 5%, and the pore walls have an inter-planar spacing less than 0.40 nm, a thermal conductivity of at least 150 W/mK (more typically at least 200 W/mk) per unit of specific gravity, and/or an electrical conductivity no less than 1,000 S/cm per unit of specific gravity.

In a preferred embodiment, the first and/or second heat treatment temperature contains a temperature in the range of 300° C.-1,500° C. and, as a result, the HA-derived foam has an oxygen content or non-carbon content less than 2%, and the pore walls have an inter-planar spacing less than 0.35 nm, a thermal conductivity of at least 250 W/mK per unit of specific gravity, and/or an electrical conductivity no less than 1,500 S/cm per unit of specific gravity.

When the first and/or second heat treatment temperature contains a temperature in the range of 1,500° C.- 2,100° C., the HA-derived foam has an oxygen content or non-carbon content less than 1% and pore walls have an inter-graphene spacing less than 0.34 nm, a thermal conductivity of at least 300 W/mK per unit of specific gravity, and/or an electrical conductivity no less than 3,000 S/cm per unit of specific gravity.

When the first and/or second heat treatment temperature contains a temperature greater than 2,100° C., the HA-derived foam has an oxygen content or non-carbon content no greater than 0.1% and pore walls have an inter-planar spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

If the first and/or second heat treatment temperature contains a temperature no less than 2,500° C., the HA-derived foam has pore walls containing stacked graphene-like hexagonal carbon planes having an inter-planar spacing less than 0.336 nm, a mosaic spread value no greater than 0.4, and a thermal conductivity greater than 400 W/mK per unit of specific gravity, and/or an electrical conductivity greater than 4,000 S/cm per unit of specific gravity.

In one embodiment, the pore walls contain stacked graphene-like hexagonal carbon planes having an inter-planar spacing less than 0.337 nm and a mosaic spread value less than 1.0. In another embodiment, the solid wall portion of the HA-derived foam exhibits a degree of graphitization no less than 80% and/or a mosaic spread value less than 0.4. In yet another embodiment, the solid wall portion of the HA-derived foam exhibits a degree of graphitization no less than 90% and/or a mosaic spread value no greater than 0.4.

Typically, after a heat treatment at a HTT higher than 2,500° C., the pore walls in the HA-derived graphitic foam contain a 3D network of interconnected hexagonal carbon atomic planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 20 nm, more typically from 1 nm to 10 nm, and further more typically from 1 nm to 4 nm.

Preferably, the HA-derived foam contains meso-scaled pores having a pore size from 2 nm to 50 nm (preferably 2 nm to 25 nm).

In a preferred embodiment, the present invention provides a roll-to-roll process for producing a solid HA foam or HA-derived foam composed of multiple pores and pore walls The process comprises: (a) preparing a humic acid dispersion having multiple humic acid molecules or sheets dispersed in a liquid medium, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) continuously or intermittently dispensing and depositing the HA dispersion onto a surface of a supporting substrate to form a wet layer of HA material, wherein the supporting substrate is a continuous thin film supplied from a feeder roller and collected on a collector roller; (c) partially or completely removing the liquid medium from the wet layer of humic acid to form a dried layer of humic acid in a heating zone or multiple heating zones; and (d) heat treating the dried layer of humic acid in one of these heating zones containing a heating temperature from 80° C. to 500° C. at a desired heating rate sufficient to activate the blowing agent for producing the humic acid-derived foam having a density from 0.01 to 1.7 g/cm³ or a specific surface area from 50 to 3,000 m²/g. In this process, heat treatments occur in situ during the roll-to-roll procedure. This is a highly cost-effective process amenable to mass production of HA-derived graphitic foam sheets that are wrapped around on a roller for ease of shipping and handling and, subsequently, ease of cutting and slitting.

The orientation-inducing stress may be a shear stress. As an example, the shear stress can be encountered in a situation as simple as a "doctor's blade" that guides the spreading of HA dispersion over a plastic or glass surface with a sufficiently high shear rate during a manual casting process. As another example, an effective orientation-inducing stress is created in an automated roll-to-roll coating process in which a "knife-on-roll" configuration dispenses the graphene dispersion over a moving solid substrate, such as a plastic film. The relative motion between this moving film and the coating knife acts to effect orientation of graphene sheets along the shear stress direction. Comma coating and slot-die coating are particularly effective methods for this function.

This orientation-inducing stress is a critically important step in the production of the presently invented HA-derived foams due to the surprising observation that the shear stress enables the HA molecules or sheets to align along a particular direction (e.g. X-direction or length-direction) to produce preferred orientations and facilitate contacts between HA molecules or sheets along foam walls. Further surprisingly, these preferred orientations and improved HA-to-HA contacts facilitate chemical merging or linking between HA molecules or sheets during the subsequent heat treatment of the dried HA layer. Such preferred orientations and improved contacts are essential to the eventual attainment of exceptionally high thermal conductivity, electrical conductivity, elastic modulus, and mechanical strength of the resulting HA-derived foam. In general, these great properties could not be obtained without such a shear stress-induced orientation control.

The present invention also provides an oil-removing or oil-separating device containing the humic acid-derived foam as an oil-absorbing element. Also provided is a solvent-removing or solvent-separating device containing the humic acid-derived foam of as a solvent-absorbing or solvent-separating element.

The invention also provides a method to separate oil from water. The method comprises the steps of: (a) providing an oil-absorbing element comprising the integral humic acid-derived foam; (b) contacting an oil-water mixture with the element, which absorbs the oil from the mixture; (c) retreating the element from the mixture and extracting the oil from the element; and (d) reusing the element.

Additionally, the invention provides a method to separate an organic solvent from a solvent-water mixture or from a multiple-solvent mixture. The method comprises the steps of: (a) providing an organic solvent-absorbing or solvent-separating element comprising the integral humic acid-derived foam; (b) bringing the element in contact with an organic solvent-water mixture or a multiple-solvent mixture containing a first solvent and at least a second solvent; (c) allowing the element to absorb the organic solvent from the mixture or separate the first solvent from the at least second solvent; (d) retreating the element from the mixture and extracting the organic solvent or first solvent from the element; and (e) reusing the element.

Also provided is a thermal management device containing the humic acid-derived foam as a heat spreading or heat dissipating element. The thermal management device may contain a device selected from a heat exchanger, heat sink, heat pipe, high-conductivity insert, conductive plate between a heat sink and a heat source, heat-spreading component, heat-dissipating component, thermal interface medium, or thermoelectric or Peltier cooling device.

DESCRIPTION OF THE PREFERRED EMBODIMENTS

Figure 1:
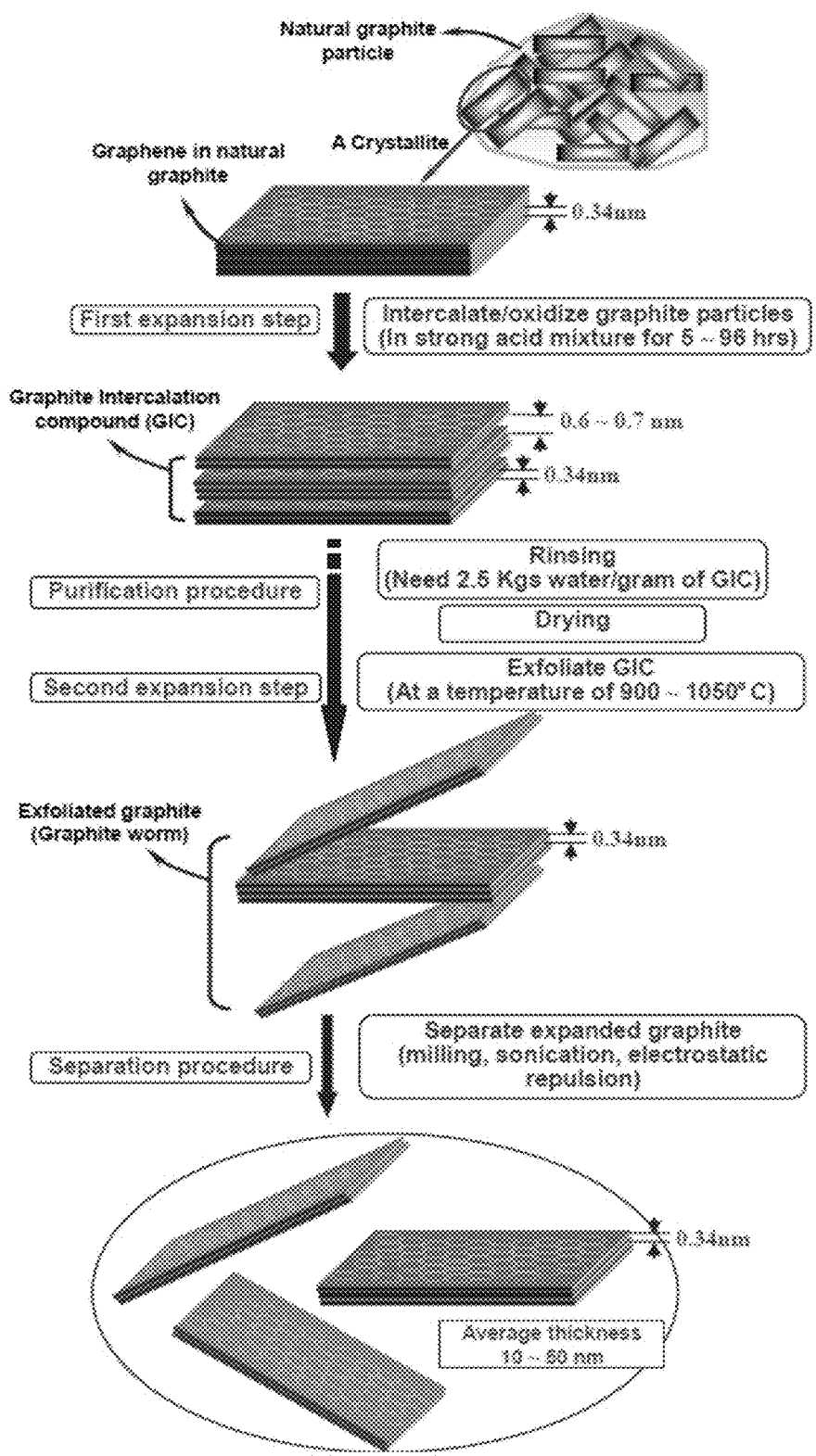
FIG. 1 Schematic drawing illustrating the processes for producing graphene sheets from natural graphite particles.

Humic acid (HA) is an organic matter commonly found in soil and can be extracted from the soil using a base (e.g. KOH). HA can also be extracted from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon, hydrogen, and nitrogen). An example of the molecular structure for humic acid, having a variety of components including quinone, phenol, catechol and sugar moieties, is given in Scheme 1 below (source: Stevenson H. J. "*Humus Chemistry: Genesis, Composition, Reactions,*" John Wiley & Sons, New York 1994).

Non-aqueous solvents for humic acid include polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

The present invention provides a humic acid-derived foam composed of multiple pores and pore walls and a process for producing same. The pores in the foam are formed during or after sheet-like humic acid molecules are (1) chemically linked/merged together (edge-to-edge and/or face-to-face) typically at a temperature from 100 to 1,500° C. and/or (2) organized into larger graphite crystals or domains (herein referred to as graphitization) along the pore walls at a high temperature (typically >2,100° C. and more typically >2,500° C.).

The invention also provides a production process comprising: (a) preparing a humic acid dispersion having multiple humic acid molecules or sheets dispersed in a liquid medium, wherein the humic acid is selected from oxidized humic acid, reduced humic acid, fluorinated humic acid, chlorinated humic acid, brominated humic acid, iodized humic acid, hydrogenated humic acid, nitrogenated humic acid, doped humic acid, chemically functionalized humic acid, or a combination thereof and wherein the dispersion contains an optional blowing agent having a blowing agent-to-humic acid weight ratio from 0/1.0 to 1.0/1.0; (b) dispensing and depositing the graphene dispersion onto a surface of a supporting substrate (e.g. plastic film, rubber sheet, metal foil, glass sheet, paper sheet, etc.) to form a wet layer of humic acid; (c) partially or completely removing the liquid medium from the wet layer of humic acid to form a dried layer of humic acid; and (d) heat treating the dried layer of humic acid at a first heat treatment temperature from 80° C. to 3,200° C. at a desired heating rate sufficient to induce volatile gas molecules from the non-carbon elements (e.g. O, H, N, B, F, Cl, Br, I, etc.) or to activate the blowing agent for producing humic acid-derived foam. Preferably,

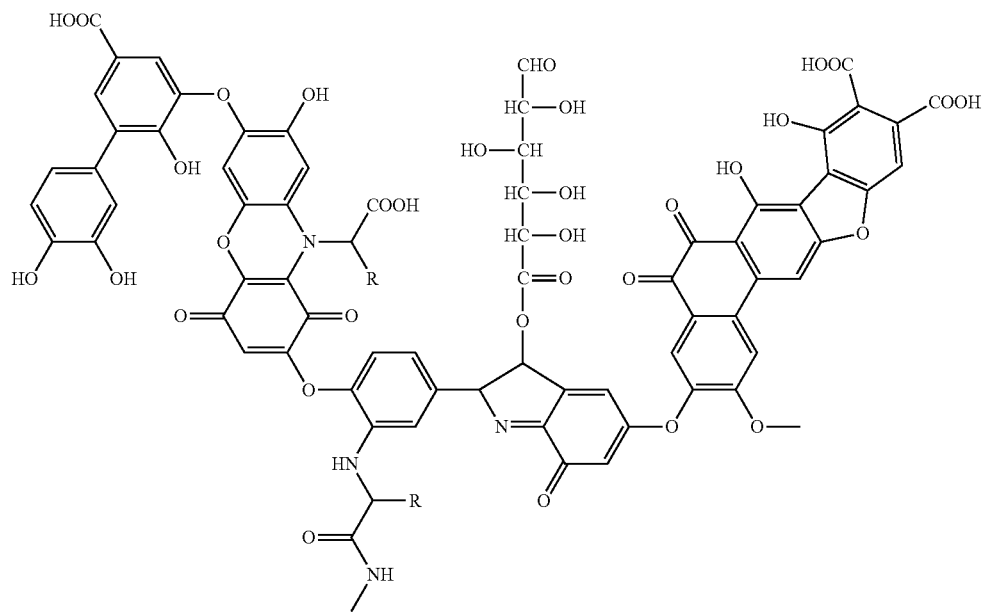

(Scheme 1)

the dispensing and depositing procedure includes subjecting the humic acid dispersion to an orientation-inducing stress. These non-carbon elements, when being removed via heat-induced decomposition, produces volatile gases that act as a foaming agent or blowing agent.

The resulting humic acid-derived foam typically has a density from 0.005 to 1.7 g/cm$^3$ (more typically from 0.01 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been previously taught or hinted that an aggregate of humic acid molecules can be converted into a graphene-like foam via a blowing agent. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the HA-derived materials while they are in a solid state. Another mechanism of producing pores in a HA material is through the generation and vaporization of volatile gases by removing those non-carbon elements in a high-temperature environment. This is a unique self-foaming process that has never been previously taught or suggested.

The pore walls (cell walls) in the presently invented foam contain chemically bonded and merged graphene-like hexagonal carbon atomic planes. These planar aromatic molecules or hexagonal structured carbon atoms are well inter-connected physically and chemically. The lateral dimensions (length or width) of these planes are huge (from 20 nm to >10 μm), typically several times or even orders of magnitude larger than the maximum length/width of the starting humic acid molecules. The hexagonal carbon atomic planes are essentially interconnected to form long electron-conducting pathways with low resistance. This is a unique and new class of material that has not been previously discovered, developed, or suggested to possibly exist.

In step (b), a HA suspension is formed into a wet layer on a solid substrate surface (e.g. PET film or glass) preferably under the influence of a shear stress. One example of such a shearing procedure is casting or coating a thin film of HA suspension using a coating machine. This procedure is similar to a layer of varnish, paint, coating, or ink being coated onto a solid substrate. The roller, "doctor's blade", or wiper can create a shear stress when the film is shaped, or when there is a relative motion between the roller/blade/wiper and the supporting substrate at a sufficiently high relative motion speed. Quite unexpectedly and significantly, such a shearing action enables the planar HA molecules to well align along, for instance, the shearing direction. Further surprisingly, such a molecular alignment state or preferred orientation is not disrupted when the liquid components in the HA suspension are subsequently removed to form a well-packed layer of highly aligned sheet-like HA molecules that are at least partially dried. The dried HA film has a high birefringence coefficient between an in-plane direction and the normal-to-plane direction.

In an embodiment, this HA layer is then subjected to a heat treatment to activate the blowing agent and/or the thermally-induced reactions that remove the non-carbon elements (e.g. F, O, etc.) from the HA molecules to generate volatile gases as by-products. These volatile gases generate pores or bubbles inside the solid HA material, pushing sheet-like HA molecules into a wall structure, forming a HA foam. If no blowing agent is added, the non-carbon elements in the HA material preferably occupy at least 10% by weight of the HA material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between hexagonal carbon atomic planes in an edge-to-edge and face-to-face manner (FIG. 2) can occur at a relatively low heat treatment temperature (e.g. as low as from 150 to 300° C.).

The HA-derived foam may be subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried HA layer experiences may be divided into four distinct HTT regimes:

Regime 1 (80° C. to 300° C.): In this temperature range (the chemical linking and thermal reduction regime and also the activation regime for a blowing agent, if present), HA layer primarily undergoes thermally-induced chemical linking of neighboring HA molecules, as schematically illustrated in the upper portion of FIG. 2. This also involves removal of some non-carbon atoms, such as 0 and H, leading to a reduction of oxygen content from typically 20-42% (of O in HA) to approximately 10-25%. This treatment results in a reduction of inter-planar spacing in foam walls from approximately 0.6-1.2 nm (as dried) down to approximately 0.4-0.6 nm, and an increase in thermal conductivity to 100 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between HA molecules occurs. The inter-planar spacing remains relatively large (0.4 nm or larger). Many O-containing functional groups survive (e.g. —OH and —COOH).

Regime 2 (300° C.-1,500° C.): In this chemical linking and merging regime, extensive chemical combination, polymerization, and cross-linking between adjacent HA molecules or linked HA molecules occur to form incipient graphene-like hexagonal carbon atomic planes, as illustrated in lower portion of FIG. 2. The oxygen content is reduced to typically from 2% to 10% (e.g. after chemical linking and merging), resulting in a reduction of inter-planar spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to >250 W/mK per unit of specific gravity, and/or electrical conductivity to 2,500-4,000 S/cm per unit of specific gravity.

Regime 3 (1,500-2,500° C.): In this ordering and graphitization regime, extensive graphitization or merging of graphene-like planes occurs, leading to significantly improved degree of structural ordering in the foam walls. As a result, the oxygen content is reduced to typically 0.1%-2% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (higher than 2,500° C.): In this re-crystallization and perfection regime, extensive movement and elimination of grain boundaries and other defects occur, resulting in the formation of nearly perfect single crystals or poly-crystalline graphene-like crystals with huge grains in the foam walls, which can be orders of magnitude larger than the original sizes of HA molecules. The oxygen content is essentially eliminated, typically 0% - 0.01%. The inter-planar spacing is reduced to down to approximately 0.3354 nm (degree of graphitization from 80% to nearly 100%), corresponding to that of a perfect graphite single crystal. The foamed structure thus obtained exhibits a thermal conductivity of >400 W/mK per unit of specific gravity, and electrical conductivity of >4,000 S/cm per unit of specific gravity.

The presently invented HA-derived foam structure can be obtained by heat-treating the dried HA with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and can cover all the 4 regimes (including Regime 4 for 0.2 to 1 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g +0.344 (1 - g)$, where $d_{002}$ is the interlayer spacing of graphite- or graphene-type crystal in nm. This equation is valid only when $d_{002}$ is equal or less than approximately 0.3440 nm. The HA-derived foam walls having a $d_{002}$ higher than 0.3440 nm reflects the presence of oxygen-containing functional groups (such as —OH, >O, and —COOH on graphene-like molecular plane surfaces or edges) that act as a spacer to increase the inter-planar spacing.

Another structural index that can be used to characterize the degree of ordering of the stacked and bonded hexagonal carbon atomic planes in the foam walls of HA-derived graphene-like and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

Figure 2:
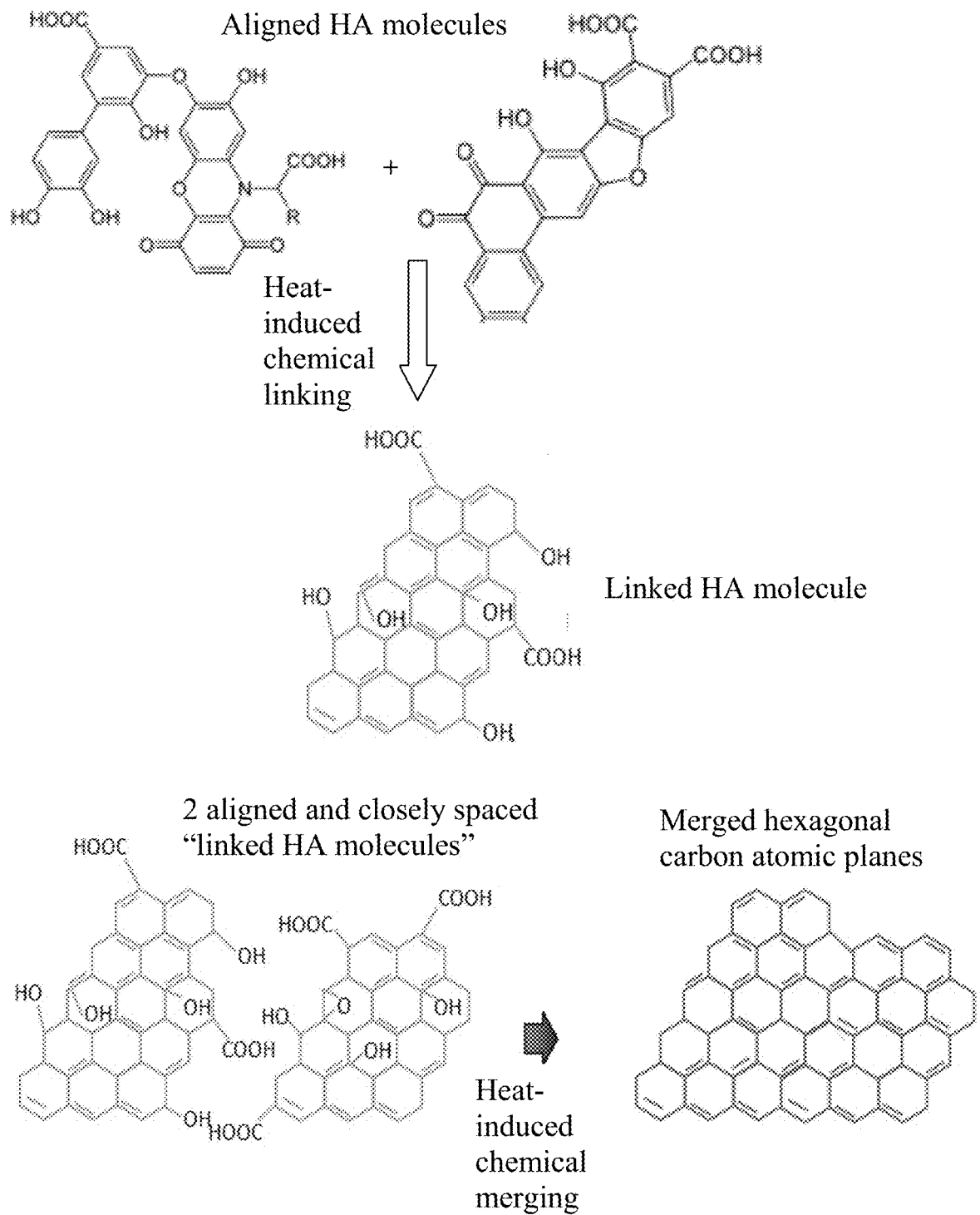
FIG. 2 A possible mechanism of chemical linking and merging between humic acid molecules and between "linked HA molecules." Two or three original HA molecules can get chemically linked together to form longer or wider HA molecules, called "linked HA molecules". Multiple "linked HA molecules" can be merged to form graphene-like hexagonal carbon atomic planes.

Illustrated in FIG. 2 is a plausible chemical linking and merging mechanism where only 2 aligned HA molecular segments are shown as an example, although a large number of HA molecules can be chemically linked together and multiple "linked HA molecules) can be chemically merged to form a foam wall. Further, chemical linking could also occur face-to-face, not just edge-to-edge for HA molecules or sheets. These linking and merging reactions proceed in such a manner that the molecules are chemically merged, linked, and integrated into one single entity. The resulting product is not a simple aggregate of individual HA sheets, but a single entity that is essentially a network of interconnected giant molecules with an essentially infinite molecular weight. All the constituent hexagonal carbon planes are very large in lateral dimensions (length and width) and, if the HTT is sufficiently high (e.g. >1,500° C. or much higher), these planes are essentially bonded together with one another.

In-depth studies using a combination of SEM, TEM, selected area diffraction, X-ray diffraction, AFM, Raman spectroscopy, and FTIR indicate that the HA-derived foam walls are composed of several huge hexagonal carbon atomic planes (with length/width typically >>20 nm, more typically >>100 nm, often >>1 μm, and, in many cases, >>10 μm, or even >>100 μm). These giant graphene-like planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(1) This HA-derived graphitic foam wall is not made by gluing or bonding discrete flakes/platelets together with a resin binder, linker, or adhesive. Instead, HA molecules are merged through joining or forming of covalent bonds with one another, into an integrated graphene-like crystal entity, without using any externally added linker or binder molecules or polymers.

(2) The foam wall is typically a poly-crystal composed of large grains having incomplete grain boundaries. This entity is derived from multiple HA molecules and these aromatic HA molecules have lost their original identity. Upon removal of the liquid component from the suspension, the resulting HA molecules form an essentially amorphous structure. Upon heat treatments, these HA molecules are chemically merged and linked into a unitary or monolithic graphitic entity that constitutes the foam wall. This foam wall is highly ordered.

(3) Due to these unique chemical composition (including oxygen or non-carbon content), morphology, crystal structure (including inter-planar spacing), and structural features (e.g. high degree of orientations, few defects, incomplete grain boundaries, chemical bonding and no gap between graphene sheets, and substantially no interruptions in hexagonal carbon planes), the HA-derived foam has a unique combination of outstanding thermal conductivity, electrical conductivity, mechanical strength, and stiffness (elastic modulus).

It may be further noted that a certain desired degree of hydrophilicity can be imparted to the pore walls of the humic acid-derived foam if the non-carbon element content (H and O) is from 2 to 20% by weight. These features enable separation of oil from water by selectively absorbing oil from an oil-water mixture. In other words, such a HA-derived foam material is capable of recovering oil from water, helping to clean up oil-spilled river, lake, or ocean. The oil absorption capacity is typically from 50% to 500% of the foam's own weight. This is a wonderfully useful material for environmental protection purposes.

If a high electrical or thermal conductivity is desired, the HA-carbon foam can be subjected to graphitization treatment at a temperature higher than 2,500° C. The resulting material is particularly useful for thermal management applications (e.g. for use to make a finned heat sink, a heat exchanger, or a heat spreader).

It may be noted that the HA-carbon foam may be subjected to compression during and/or after the graphitization treatment. This operation enables us to adjust the graphene sheet orientation and the degree of porosity.

In order to characterize the structure of the graphitic materials produced, X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. In the present study, the graphene-like (HA or RHA) foam walls having a $d_{002}$ higher than 0.3440 nm reflects the presence of oxygen-containing functional groups (such as —OH, >O, and —COOH on graphene molecular plane surfaces or edges) that act as a spacer to increase the inter-graphene spacing.

Another structural index that can be used to characterize the degree of ordering of the stacked and bonded RHA planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our RHA walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the humic acid-carbon foam walls are composed of several large graphene planes (with length/width typically >>20 nm, more typically >>100 nm, often >>1 μm, and, in many cases, >>10 μm). This is quite unexpected since the lateral dimensions (length and width) of original humic acid sheets or molecules, prior to being heat treated, are typically <20 nm and more typically <10 nm. This implies that a plurality of HA sheets or molecules can be merged edge to edge through covalent bonds with one another, into a larger (longer or wider) sheet.

These large graphene-like planes also can be stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral HA-derived foam is composed of multiple pores and pore walls, wherein the pore walls contain single-layer or few-layer HA sheets chemically bonded together, wherein the few-layer HA sheets have 2-10 layers of stacked graphene-like merged HA planes having an inter-plane spacing $d_{002}$ from 0.3354 nm to 0.36 nm as measured by X-ray diffraction and the single-layer or few-layer graphene-like HA sheets contain 0.01% to 25% by weight of non-carbon elements (more typically <15%).

The integral HA-derived foam typically has a density from 0.001 to 1.7 $g/cm^3$, a specific surface area from 50 to 3,000 $m^2/g$, a thermal conductivity of at least 200 W/mK per unit of specific gravity, and/or an electrical conductivity no less than 2,000 S/cm per unit of specific gravity. In a preferred embodiment, the pore walls contain stacked graphene-like RHA planes having an inter-planar spacing $d_{002}$ from 0.3354 nm to 0.40 nm as measured by X-ray diffraction.

Many of the HA sheets can be merged edge to edge through covalent bonds with one another, into an integrated reduced HA (RHA) entity. Due to these unique chemical composition (including oxygen or hydrogen content, etc.), morphology, crystal structure (including inter-planar spacing), and structural features (e.g. degree of orientations, few defects, chemical bonding and no gap between graphene-like sheets, and substantially no interruptions along hexagonal plane directions), the HA-derived foam has a unique combination of outstanding thermal conductivity, electrical conductivity, mechanical strength, and stiffness (elastic modulus).

Thermal Management Applications

The aforementioned features and characteristics make the integral HA-derived foam an ideal element for a broad array of engineering and biomedical applications. For instance, for thermal management purposes alone, the foam can be used in the following applications:
a) The HA-derived foam, being compressible and of high thermal conductivity, is ideally suited for use as a thermal interface material (TIM) that can be implemented between a heat source and a heat spreader or between a heat source and a heat sink.
b) The HA-derived foam can be used as a heat spreader per se due to its high thermal conductivity.
c) The HA-derived foam can be used as a heat sink or heat dissipating material due to his high heat-spreading capability (high thermal conductivity) and high heat-dissipating capability (large number of surface pores inducing massive air-convection micro or nano channels).
d) The light weight (low density adjustable between 0.001 and 1.8 $g/cm^3$), high thermal conductivity per unit specific gravity or per unit of physical density, and high structural integrity (HA sheets being merged together to form long electron-conducting paths) make this HA-derived foam an ideal material for a durable heat exchanger.

The HA-derived foam foam-based thermal management or heat dissipating devices include a heat exchanger, a heat sink (e.g. finned heat sink), a heat pipe, high-conductivity insert, thin or thick conductive plate (between a heat sink and a heat source), thermal interface medium (or thermal interface material, TIM), thermoelectric or Peltier cooling plate, etc.

A heat exchanger is a device used to transfer heat between one or more fluids; e.g. a gas and a liquid separately flowing in different channels. The fluids are typically separated by a solid wall to prevent mixing. The presently invented HA-derived foam material is an ideal material for such a wall provided the foam is not a totally open-cell foam that allows for mixing of fluids. The presently invented method enables production of both open-cell and closed-cell foam structures. The high surface pore areas enable dramatically faster exchange of heats between the two or multiple fluids.

Heat exchangers are widely used in refrigeration systems, air conditioning units, heaters, power stations, chemical plants, petrochemical plants, petroleum refineries, natural-gas processing, and sewage treatment. A well-known example of a heat exchanger is found in an internal combustion engine in which a circulating engine coolant flows through radiator coils while air flows past the coils, which cools the coolant and heats the incoming air. The solid walls (e.g. that constitute the radiator coils) are normally made of a high thermal conductivity material, such as Cu and Al. The presently invented HA-derived foam having either a higher thermal conductivity or higher specific surface area is a superior alternative to Cu and Al, for instance.

There are many types of heat exchangers that are commercially available: shell and tube heat exchanger, plate heat exchangers, plate and shell heat exchanger, adiabatic wheel heat exchanger, plate fin heat exchanger, pillow plate heat exchanger, fluid heat exchangers, waste heat recovery units, dynamic scraped surface heat exchanger, phase-change heat exchangers, direct contact heat exchangers, and microchannel heat exchangers. Every one of these types of heat exchangers can take advantage of the exceptional high thermal conductivity and specific surface area of the presently invented foam material.

The presently invented solid HA-derived foam can also be used in a heat sink. Heat sinks are widely used in electronic devices for heat dissipation purposes. The central processing unit (CPU) and battery in a portable microelectronic device (such as a notebook computer, tablet, and smart phone) are well-known heat sources. Typically, a metal or graphite object (e.g. Cu foil or graphite foil) is brought into contact with the hot surface and this object helps to spread the heat to an external surface or outside air (primarily by conduction and convection and to a lesser extent by radiation). In most cases, a thin thermal interface material (TIM) mediates between the hot surface of the heat source and a heat spreader or a heat-spreading surface of a heat sink. (The presently invented HA-derived foam can also be used as a TIM.)

A heat sink usually consists of a high-conductivity material structure with one or more flat surfaces to ensure good thermal contact with the components to be cooled, and an array of comb or fin like protrusions to increase the surface contact with the air, and thus the rate of heat dissipation. A heat sink may be used in conjunction with a fan to increase the rate of airflow over the heat sink. A heat sink can have multiple fins (extended or protruded surfaces) to improve heat transfer. In electronic devices with limited amount of space, the shape/arrangement of fins must be optimized such that the heat transfer density is maximized. Alternatively or additionally, cavities (inverted fins) may be embedded in the regions formed between adjacent fins. These cavities are effective in extracting heat from a variety of heat generating bodies to a heat sink.

Typically, an integrated heat sink comprises a heat collection member (core or base) and at least one heat dissipation member (e.g. a fin or multiple fins) integral to the heat collection member (base) to form a finned heat sink. The fins and the core are naturally connected or integrated together into a unified body without using an externally applied adhesive or mechanical fastening means to connect the fins to the core. The heat collection base has a surface in thermal contact with a heat source (e.g. a LED), collects heat from this heat source, and dissipates heat through the fins into the air.

Figure 10:
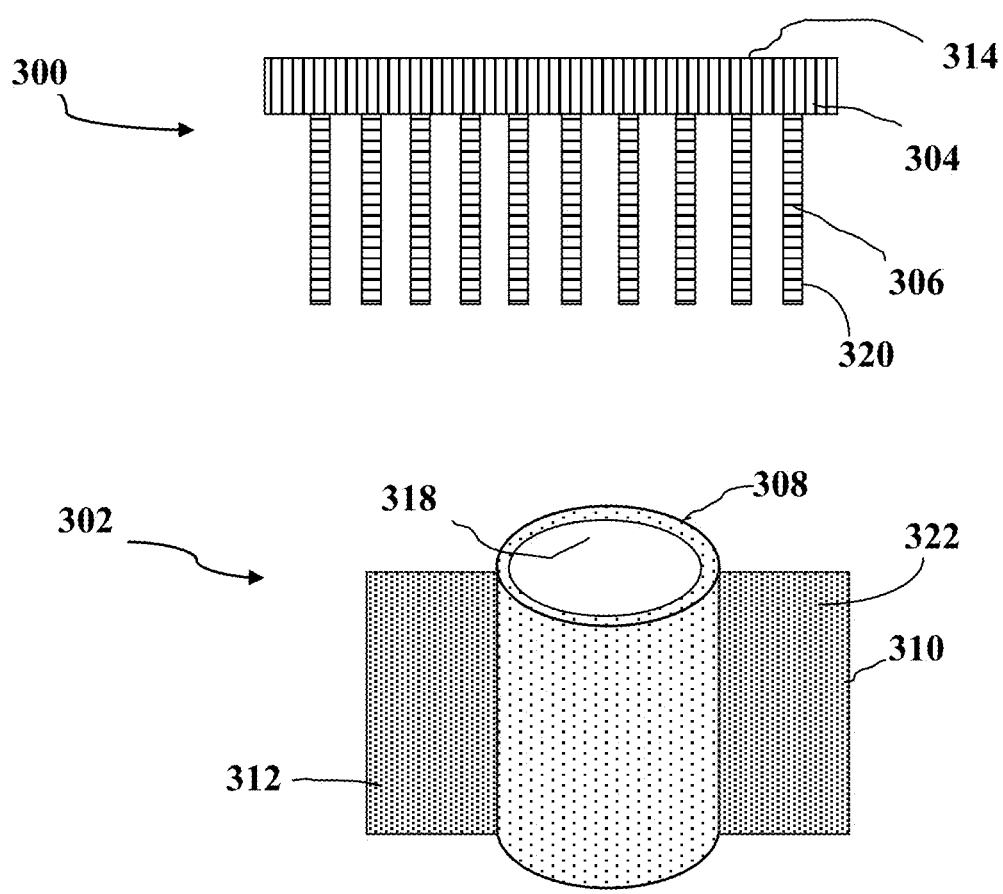
FIG. 10 Schematic of heat sink structures (2 examples).

As illustrative examples, FIG. 10 provides a schematic of two heat sinks: 300 and 302. The first one contains a heat collection member (or base member) 304 and multiple fins or heat dissipation members (e.g. fin 306) connected to the base member 304. The base member 304 is shown to have a heat collection surface 314 intended to be in thermal contact with a heat source. The heat dissipation member or fin 306 is shown to have at least a heat dissipation surface 320.

A particularly useful embodiment is an integrated radial heat sink 302 comprising a radial finned heat sink assembly that comprises: (a) a base 308 comprising a heat collection surface 318; and (b) a plurality of spaced parallel planar fin members (e.g. 310, 312 as two examples) supported by or integral with the base 308, wherein the planar fin members (e.g. 310) comprise the at least one heat dissipation surface 322. Multiple parallel planar fin members are preferably equally spaced.

The presently invented HA-derived foam, being highly elastic and resilient, is itself a good thermal interface material and a highly effective heat spreading element as well. In addition, this high-conductivity foam can also be used as an inserts for electronic cooling and for enhancing the heat removal from small chips to a heat sink. Because the space occupied by high conductivity materials is a major concern, it is a more efficient design to make use of high conductivity pathways that can be embedded into a heat generating body. The elastic and highly conducting solid graphene foam herein disclosed meets these requirements perfectly.

The high elasticity and high thermal conductivity make the presently invented solid HA-derived foam a good conductive thick plate to be placed as a heat transfer interface between a heat source and a cold flowing fluid (or any other heat sink) to improve the cooling performance. In such arrangement, the heat source is cooled under the thick HA-derived foam plate instead of being cooled in direct contact with the cooling fluid. The thick plate of HA-derived foam can significantly improve the heat transfer between the heat source and the cooling fluid by way of conducting the heat current in an optimal manner. No additional pumping power and no extra heat transfer surface area are required.

The HA-derived foam is also an outstanding material to construct a heat pipe. A heat pipe is a heat transfer device that uses evaporation and condensation of a two-phase working fluid or coolant to transport large quantities of heat with a very small difference in temperature between the hot and cold interfaces. A conventional heat pipe consists of sealed hollow tube made of a thermally conductive metal such as Cu or Al, and a wick to return the working fluid from the evaporator to the condenser. The pipe contains both saturated liquid and vapor of a working fluid (such as water, methanol or ammonia), all other gases being excluded. However, both Cu and Al are prone to oxidation or corrosion and, hence, their performance degrades relatively fast over time. In contrast, the HA-derived foam is chemically inert and does not have these oxidation or corrosion issues. The heat pipe for electronics thermal management can have a foam envelope and wick, with water as the working fluid. HA-derived foam/methanol may be used if the heat pipe needs to operate below the freezing point of water, and HA-derived foam/ammonia heat pipes may be used for electronics cooling in space.

Peltier cooling plates operate on the Peltier effect to create a heat flux between the junction of two different conductors of electricity by applying an electric current. This effect is commonly used for cooling electronic components and small instruments. In practice, many such junctions may be arranged in series to increase the effect to the amount of heating or cooling required. The HA-derived foam may be used to improve the heat transfer efficiency.

Filtration and Fluid Absorption Applications

The HA-derived foam can be made to contain microscopic pores (<2 nm) or meso-scaled pores having a pore size from 2 nm to 50 nm. The HA-derived foam can also be made to contain micron-scaled pores (1-500 μm). Based on well-controlled pore size alone, the instant HA-derived foam can be an exceptional filter material for air or water filtration.

Further, the humic acid (HA) pore wall chemistry can be controlled to impart different amounts and/or types of functional groups to the pore walls (e.g. as reflected by the percentage of O, F, N, H, etc. in the foam). In other words, the concurrent or independent control of both pore sizes and chemical functional groups at different sites of the internal structure provide unprecedented flexibility or highest degree of freedom in designing and making HA-derived foams that exhibit many unexpected properties, synergistic effects, and some unique combination of properties that are normally considered mutually exclusive (e.g. some part of the structure is hydrophobic and other part hydrophilic; or the foam structure is both hydrophobic and oleophilic). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water. The present method allows for precise control over hydrophobicity, hydrophilicity, and oleophilicity.

The present invention also provides an oil-removing, oil-separating, or oil-recovering device, which contains the presently invented HA-derived foam as an oil-absorbing or oil-separating element. Also provided is a solvent-removing or solvent-separating device containing the HA-derived foam as a solvent-absorbing element.

A major advantage of using the instant HA-derived foam as an oil-absorbing element is its structural integrity. Due to the notion that HA sheets are chemically merged and thus of high structural integrity, the resulting foam would not get disintegrated upon repeated oil absorption operations. In contrast, we have discovered that graphene-based oil-absorbing elements prepared by hydrothermal reduction, vacuum-assisted filtration, or freeze-drying get disintegrated after absorbing oil for 2 or 3 times. There is just nothing (other than weak van der Waals forces existing prior to first contact with oil) to hold these otherwise separated graphene sheets together. Once these graphene sheets are wetted by oil, they no longer are able to return to the original shape of the oil-absorbing element.

Another major advantage of the instant technology is the flexibility in designing and making oil-absorbing elements that are capable of absorbing oil up to an amount as high as 400 times of its own weight yet still maintaining its structural shape (without significant expansion). This amount depends upon the specific pore volume of the foam, which can be controlled mainly by the ratio between the amount of original carrier polymer particles and the amount of HA molecules or sheets prior to the heat treatment.

The invention also provides a method to separate/recover oil from an oil-water mixture (e.g. oil-spilled water or waste water from oil sand). The method comprises the steps of (a) providing an oil-absorbing element comprising an integral HA-derived foam; (b) contacting an oil-water mixture with the element, which absorbs the oil from the mixture; and (c) retreating the oil-absorbing element from the mixture and extracting the oil from the element. Preferably, the method comprises a further step of (d) reusing the element.

Additionally, the invention provides a method to separate an organic solvent from a solvent-water mixture or from a multiple-solvent mixture. The method comprises the steps of (a) providing an organic solvent-absorbing element comprising an integral HA-derived foam; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains an additional step (e) of reusing the solvent-absorbing element.

The following examples are used to illustrate some specific details about the best modes of practicing the instant invention and should not be construed as limiting the scope of the invention.

EXAMPLE 1

Humic Acid and Reduced Humic Acid from Leonardite

Humic acid can be extracted from leonardite by dispersing leonardite in a basic aqueous solution (pH of 10) with a very high yield (in the range of 75%). Subsequent acidification of the solution leads to precipitation of humic acid powder. In an experiment, 3 g of leonardite was dissolved by 300 ml of double deionized water containing 1M KOH (or $NH_4OH$) solution under magnetic stirring. The pH value was adjusted to 10. The solution was then filtered to remove any big particles or any residual impurities. The resulting humic acid dispersion, containing HC alone or with the presence of a blowing agent, was cast onto a glass substrate to form a series of films for subsequent heat treatments.

In some samples, a chemical blowing agent (hydrazo dicarbonamide) was added to the suspension just prior to casting. The resulting suspension was then cast onto a glass surface using a doctor's blade to exert shear stresses, inducing HA molecular orientations. The resulting HA coating films, after removal of liquid, have a thickness that can be varied from approximately 10 nm to 500 µm (preferably and typically from 1 µm to 50 µm).

For making HA foam specimens, HA coating films were then subjected to heat treatments that typically involve an initial thermal reduction temperature of 80-350° C. for 1-8 hours, followed by heat-treating at a second temperature of 1,500-2,850° C. for 0.5 to 5 hours. It may be noted that we have found it essential to apply a compressive stress to the coating film sample while being subjected to the first heat treatment. This compressing stress seems to have helped maintain good contacts between the HA molecules or sheets so that chemical merging and linking between HA molecules or sheets can occur while pores are being formed. Without such a compressive stress, the heat-treated film typically is excessively porous with constituent hexagonal carbon atomic planes in the pore walls being very poorly oriented/positioned, and incapable of chemical merging and linking with one another. As a result, the thermal conductivity, electrical conductivity, and mechanical strength of the graphene foam are severely compromised.

EXAMPLE 2

Various Blowing Agents and Pore-forming (Bubble-producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second component in the suspension, which can be deposited onto the solid supporting substrate to form a wet layer. This wet layer of HA material may then be dried and heat treated to activate the chemical blowing agent. After a chemical blowing agent is activated and bubbles are generated, the resulting foamed HA structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range of 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bi-carbonate (baking soda), hydrazine, hydrazide, azodicarbonamide (exothermic chemical blowing agents), nitroso compounds (e.g. N,N-Dinitroso pentamethylene tetramine), hydrazine derivatives (e.g. 4.4'-Oxybis (benzenesulfonyl hydrazide) and Hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a HA material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of HA material is capable of maintaining a controlled amount of pores or bubbles during liquid removal and subsequent heat treatments.

Technically feasible blowing agents include Carbon dioxide ($CO_2$), Nitrogen ($N_2$), Isobutane ($C_4H_{10}$), Cyclopentane ($C_5H_{10}$), Isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-HA material weight ratio, which is typically from 0/1.0 to 1.0/1.0.

EXAMPLE 3

Preparation of Humic Acid from Coal

In a typical procedure, 300 mg of coal was suspended in concentrated sulfuric acid (60 ml) and nitric acid (20 ml), and followed by cup sonication for 2 h. The reaction was then stirred and heated in an oil bath at 100 or 120° C. for 24 h. The solution was cooled to room temperature and poured into a beaker containing 100 ml ice, followed by a step of adding NaOH (3M) until the pH value reached 7.

In one experiment, the neutral mixture was then filtered through a 0.45-mm polytetrafluoroethylene membrane and the filtrate was dialyzed in 1,000 Da dialysis bag for 5 days. For the larger humic acid sheets, the time can be shortened to 1 to 2 h using cross-flow ultrafiltration. After purification, the solution was concentrated using rotary evaporation to obtain solid humic acid sheets. These humic acid sheets alone and their mixtures with a blowing agent were re-dispersed in a solvent (ethylene glycol and alcohol, separately) to obtain several dispersion samples for subsequent casting or coating.

Various amounts (1%-30% by weight relative to HA material) of chemical bowing agents (N,N-Dinitroso pentamethylene tetramine or 4.4'-Oxybis (benzenesulfonyl hydrazide) were added to a suspension containing HA sheets. The suspension was then cast onto a glass surface using a doctor's blade to exert shear stresses, inducing orientation and proper positioning of HA molecules or sheets. Several samples were cast, including one that was made using $CO_2$ as a physical blowing agent introduced into the suspension just prior to casting. The resulting HA films, after removal of liquid, have a thickness that can be varied from approximately 1 to 100 μm.

The HA films were then subjected to heat treatments that involve an initial (first) thermal reduction temperature of 80-1,500° C. for 1-5 hours. This first heat treatment generated a HA foam (if HTT is <300° C.) and a foam of large sheet-like HA molecules or domains of hexagonal carbon atomic planes in the pore walls (if HTT is from 300 to 1,500° C.). Some of the foam samples were then subjected to a second temperature of 1,500-2,850° C. to determine if the graphene-like domains of hexagonal carbon atomic planes in the foam wall could be further perfected (graphitized to become more ordered or having a higher degree of crystallinity).

COMPARATIVE EXAMPLE 3-a

CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

COMPARATIVE EXAMPLE 3-b

Conventional Graphitic Foam from Pitch-based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C/min. The temperature was held for at least 15 minutes to achieve a soak and then the furnace power was turned off and cooled to room temperature at a rate of approximately 1.5 degree C/min with release of pressure at a rate of approximately 2 psi/min. Final foam temperatures were 630° C. and 800° C. During the cooling cycle, pressure is released gradually to atmospheric conditions. The foam was then heat treated to 1050° C. under a nitrogen blanket and then heat treated in separate runs in a graphite crucible to 2500° C. and 2800° C. in Argon.

Samples from the foam were machined into specimens for measuring the thermal conductivity. The bulk thermal conductivity ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented HA-derived graphitic foam having a comparable physical density are 5.7 MPa and 103 MPa, respectively.

Figure 3A:
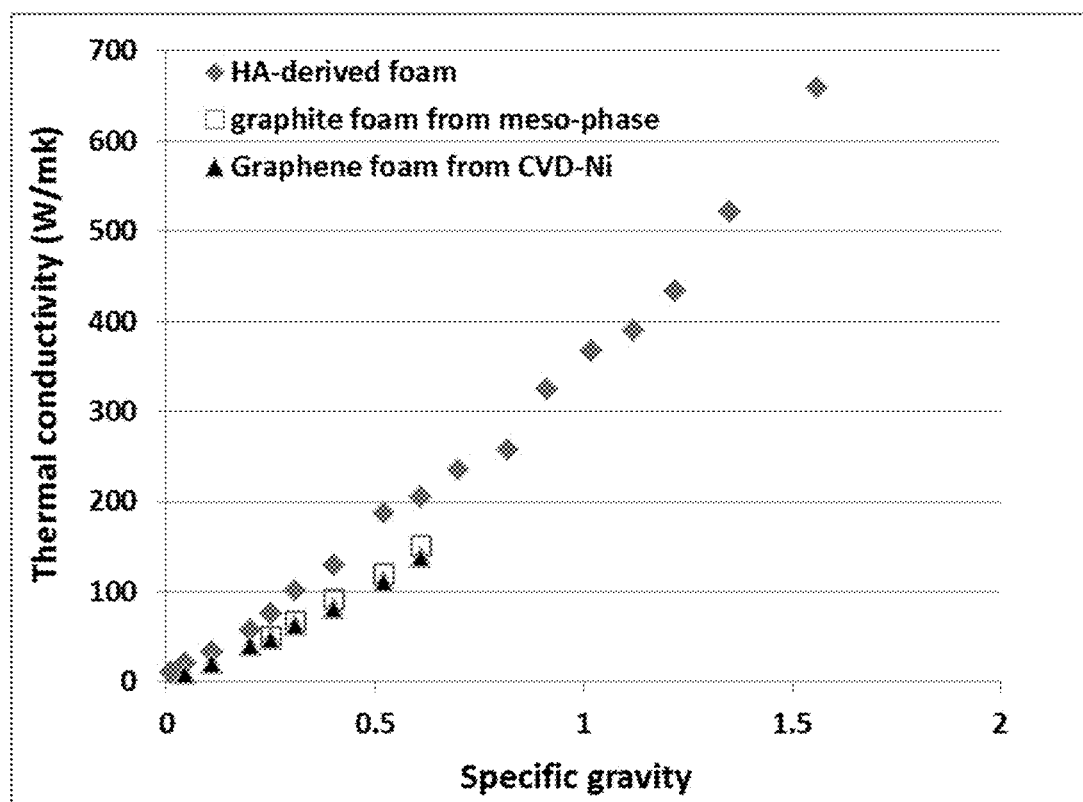
FIG. 3(A) Thermal conductivity values vs. specific gravity of the HA-derived foam produced by the presently invented process, meso-phase pitch-derived graphite foam, and Ni foam-template assisted CVD graphene foam.
Figure 5:
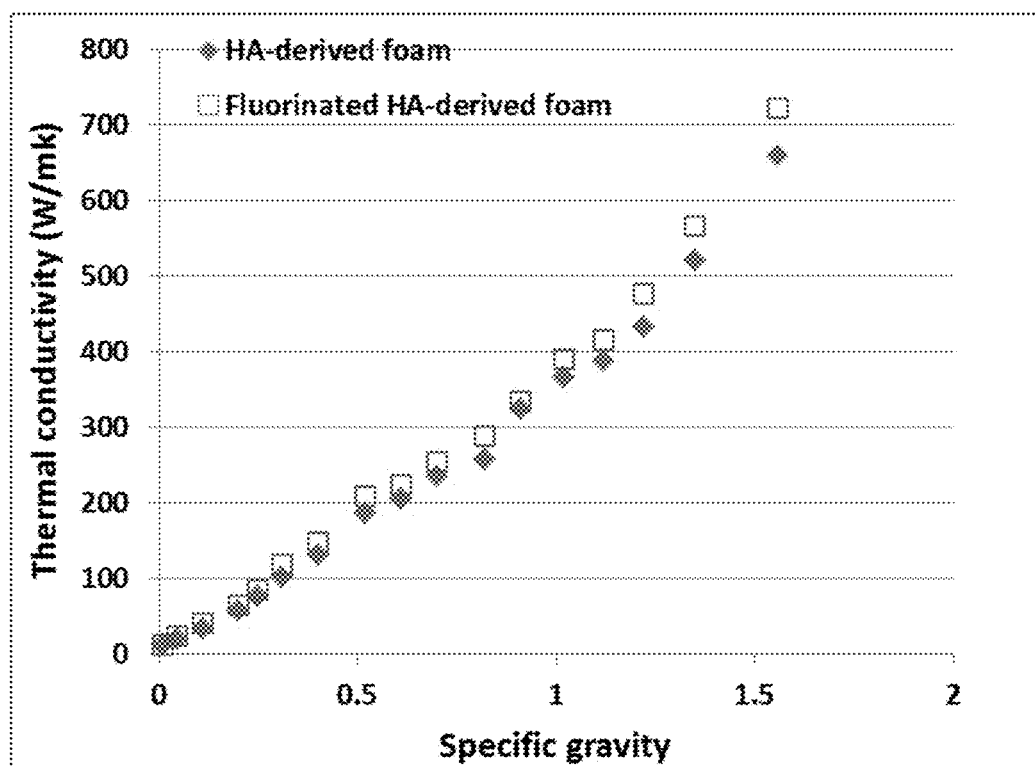
FIG. 5 Thermal conductivity values of the foam samples, derived from HA and fluorinated HA, plotted as a function of the specific gravity.

Shown in FIG. 3(A) are the thermal conductivity values vs. specific gravity of the HA-derived foam, meso-phase pitch-derived graphite foam, and Ni foam template-assisted CVD graphene foam. These data clearly demonstrate the following unexpected results:

1) HA-derived foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a much higher thermal conductivity compared to HA-derived hexagonal carbon atomic planes, which are highly defective (having a high defect population and, hence, low conductivity) after the oxygen-containing functional groups are removed via conventional thermal or chemical reduction methods. These exceptionally high thermal conductivity values observed with the HA-derived graphitic foams herein produced are much to our surprise.
3) Given the same amount of solid material, the presently invented HA-derived foam after a heat treatment at a HTT>1,500° C. is intrinsically most conducting, reflecting a high level of graphitic crystal perfection (larger crystal dimensions, fewer grain boundaries and other defects, better crystal orientation, etc.). This is also unexpected.
4) The specific conductivity values of the presently invented HA-derived foam and fluorinated HA-derived foams (FIG. 5) exhibit values from 250 to 490 W/mK per unit of specific gravity; but those of the other two foam materials are typically lower than 250 W/mK per unit of specific gravity.

COMPARATIVE EXAMPLE 3-c

Preparation of Pristine Graphene Foam (0% Oxygen)

Recognizing the possibility of the high defect population in HA sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication process (also known as the liquid-phase exfoliation in the art).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N,N-Dinitroso pentamethylene tetramine or 4.4'-Oxybis (benzenesulfonyl hydrazide) were added to a suspension containing pristine graphene sheets and a surfactant. The suspension was then cast onto a glass surface. Several samples were cast, including one that was made using $CO_2$ as a physical blowing agent introduced into the suspension just prior to casting. The resulting graphene films, after removal of liquid, have a thickness that can be varied from approximately 10 to 100 μm. The graphene films were then subjected to heat treatments at a temperature of 80-1,500° C. for 1-5 hours, which generated a graphene foam.

Figure 6:
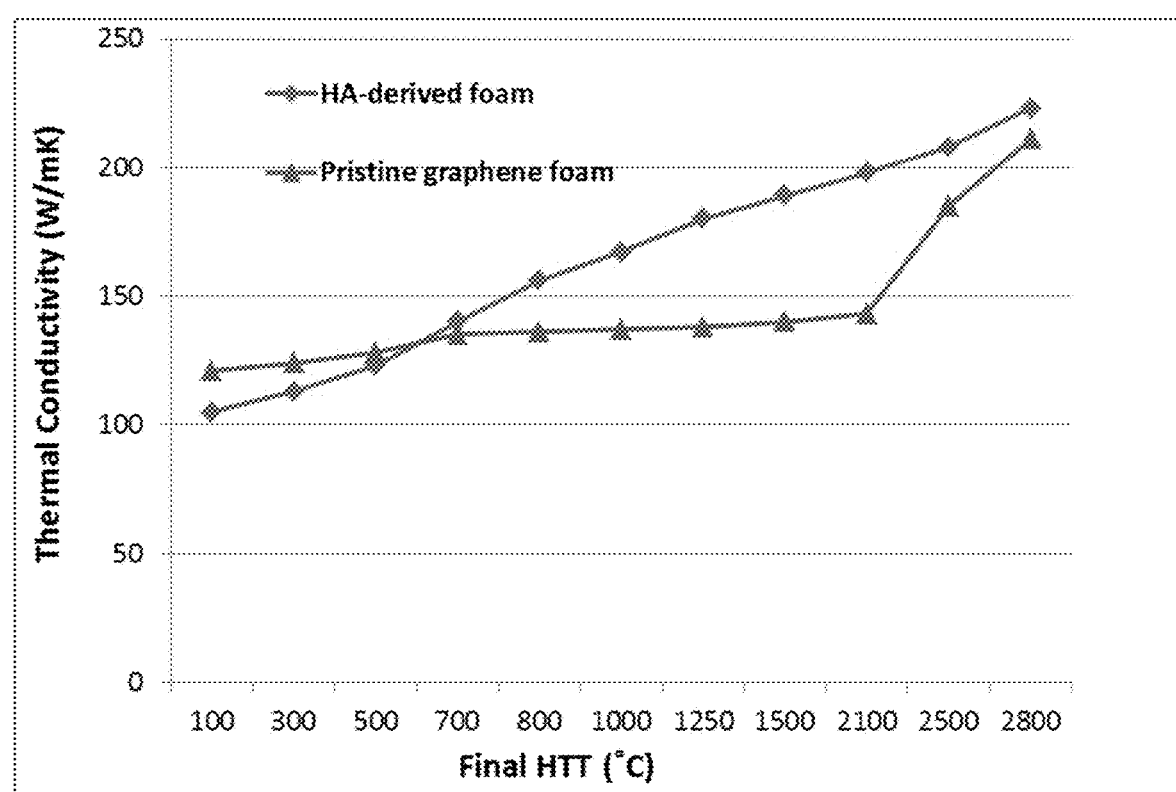
FIG. 6 Thermal conductivity values of foam samples derived from HA and pristine graphene as a function of the final (maximum) heat treatment temperature.

Summarized in FIG. 6 are thermal conductivity data for a series of HA-derived foams and a series of pristine graphene derived foams, both plotted over the same final (maximum) heat treatment temperatures. These data indicate that the thermal conductivity of the HA-derived foams is highly sensitive to the final heat treatment temperature (HTT). Even when the HTT is very low, clearly some type of HA molecular linking and merging or crystal perfection reactions have already been activated. The thermal conductivity increases monotonically with the final HTT. In contrast, the thermal conductivity of pristine graphene foams remains relatively constant until a final HTT of approximately 2,500° C. is reached, signaling the beginning of a re-crystallization and perfection of graphite crystals. There are no functional groups in pristine graphene, such as —COOH and —OH in HA, that enable chemical linking of molecules at relatively low HTTs. With a HTT as low as 1,250° C., HA molecules and resulting hexagonal carbon atomic planes can merge to form significantly larger graphene-like hexagonal carbon sheets with reduced grain boundaries and fewer electron transport path interruptions. Even though HA-derived sheets are intrinsically more defective than pristine graphene, the presently invented process enables the HA molecules to form graphitic foams that outperform pristine graphene foams. This is another unexpected result.

COMPARATIVE EXAMPLE 3-d:

Preparation of Graphene Oxide (GO) Suspension from Natural Graphite and Graphene Foams from Hydrothermally Reduced Graphene Oxide Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

A self-assembled graphene hydrogel (SGH) sample was then prepared by a hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented HA-derived foams produced by heat treating at the same temperature.

COMPARATIVE EXAMPLE 3-e

Plastic Bead Template-assisted Formation of Reduced Graphene Oxide Foams

A hard template-directed ordered assembly for a macro-porous bubbled graphene film (MGF) was prepared. Monodisperse poly methyl methacrylate (PMMA) latex spheres were used as the hard templates. The GO liquid crystal prepared in Comparative Example 3-d above was mixed with a PMMA spheres suspension. Subsequent vacuum filtration was then conducted to prepare the assembly of PMMA spheres and GO sheets, with GO sheets wrapped around the PMMA beads. A composite film was peeled off from the filter, air dried and calcinated at 800° C. to remove the PMMA template and thermally reduce GO into RGO simultaneously. The grey free-standing PMMA/GO film turned black after calcination, while the graphene film remained porous.

Figure 3B:
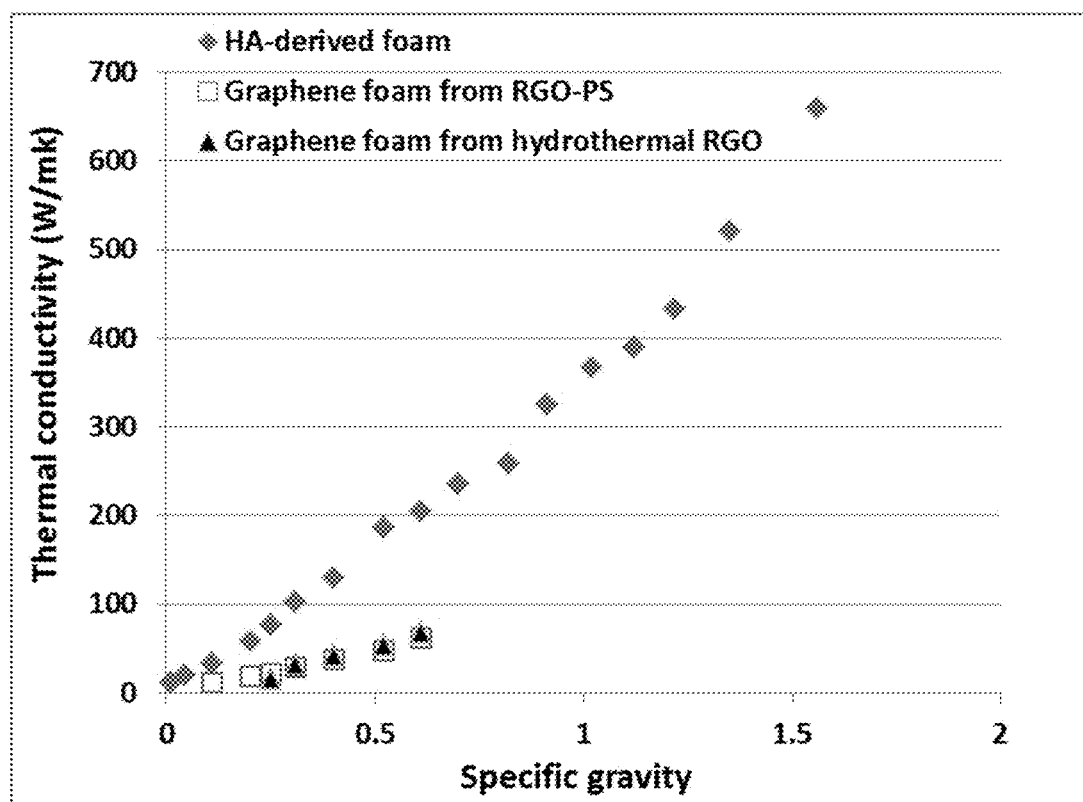
FIG. 3(B) Thermal conductivity values of the HA-derived foam, sacrificial plastic bead-templated GO foam, and the hydrothermally reduced GO graphene foam.
Figure 4:
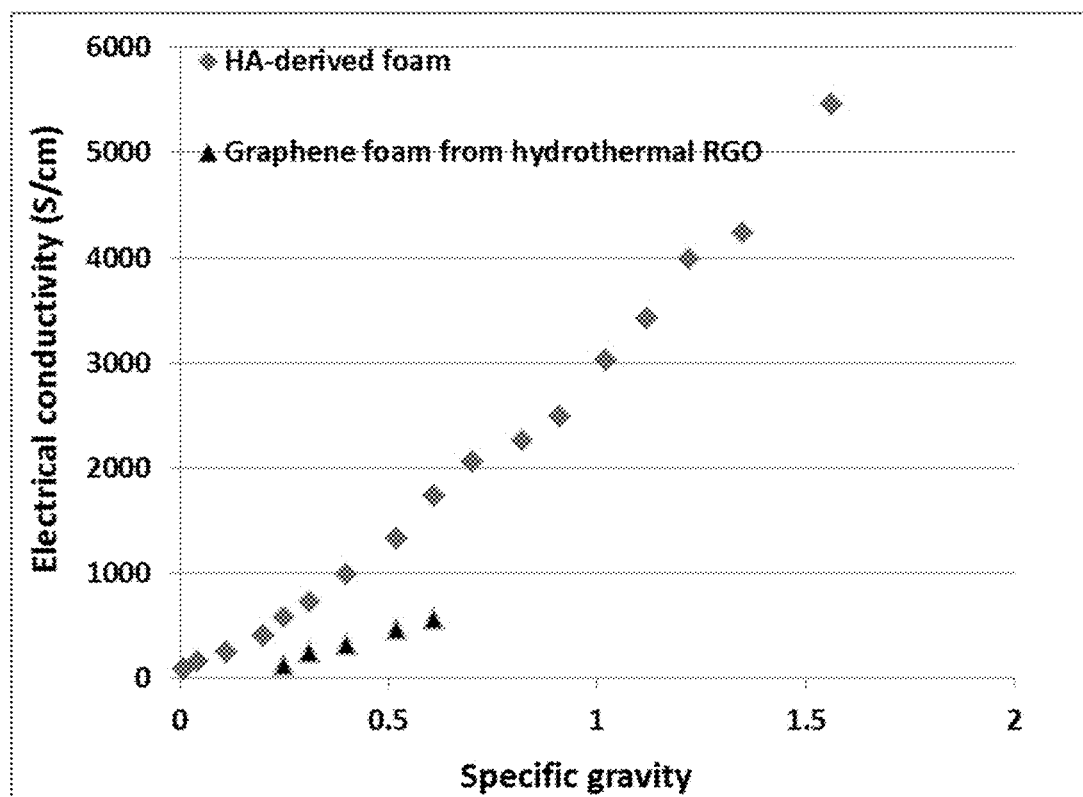
FIG. 4 Electrical conductivity data from the HA-derived foam produced by the presently invented process and the hydrothermally reduced GO graphene foam.

FIG. 3(B) shows the thermal conductivity values of the presently invented HA-derived foam, GO foam produced via sacrificial plastic bead template-assisted process, and hydrothermally reduced GO graphene foam. Most surprisingly, given the same HTTs, the presently invented HA-derived foam exhibits the highest thermal conductivity. Electrical conductivity data summarized in FIG. 4 are also consistent with this conclusion. These data further support the notion that, given the same amount of solid material, the presently invented HA suspension deposition (with stress-induced orientation) and subsequent heat treatments give rise to a HA-derived foam that is intrinsically most conducting, reflecting a highest level of graphitic crystal perfection (larger crystal dimensions, fewer grain boundaries and other defects, better crystal orientation, etc. along the pore walls).

It is of significance to point out that all the prior art processes for producing graphite foams or graphene foams appear to provide macro-porous foams having a physical density in the range of approximately 0.2- 0.6 g/cm$^3$ only with pore sizes being typically too large (e.g. from 20 to 300 µm) for most of the intended applications. In contrast, the instant invention provides processes that generate HA-derived foams having a density that can be as low as 0.01 g/cm$^3$ and as high as 1.7 g/cm$^3$. The pore sizes can be varied between meso-scaled (2-50 nm) up to macro-scaled (1-500 µm) depending upon the contents of non-carbon elements and the amount/type of blowing agent used. This level of flexibility and versatility in designing various types of graphitic foams is unprecedented and un-matched by any prior art process.

EXAMPLES 4

Preparation of Fluorinated HA Foams

Figure 9:
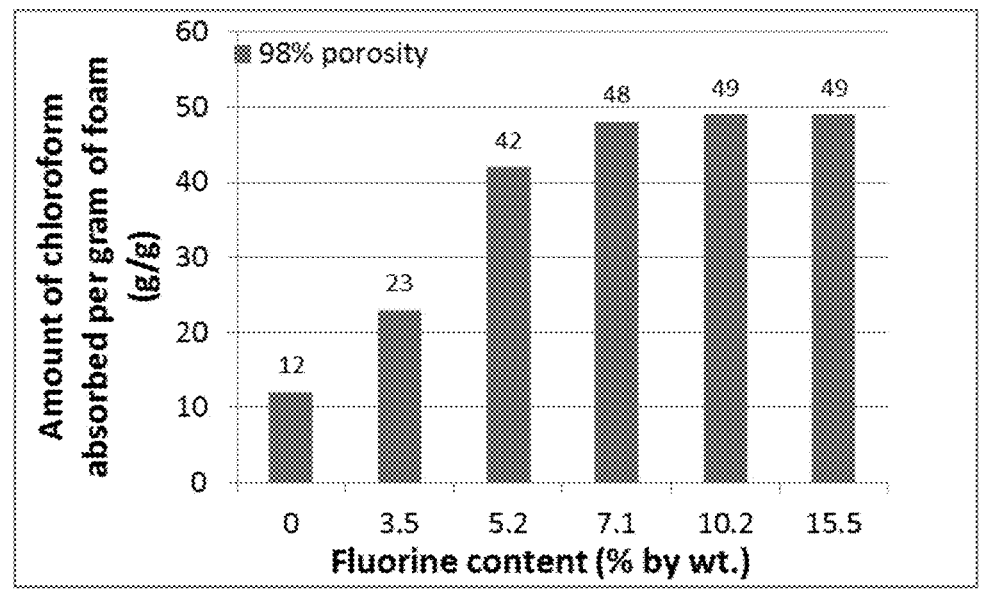
FIG. 9 The amount of chloroform absorbed out of a chloroform-water mixture, plotted as a function of the degree of fluorination.

In a typical procedure, a sheet of HA-derived foam was fluorinated by vapors of chlorine trifluoride in a sealed autoclave reactor to yield fluorinated HA-carbon hybrid film. Different durations of fluorination time were allowed for achieving different degrees of fluorination. Sheets of fluorinated HA-derived foam were then separately immersed in containers each containing a chloroform-water mixture. We observed that these foam sheets selectively absorb chloroform from water and the amount of chloroform absorbed increases with the degree of fluorination until the fluorine content reaches 7.2% by wt., as indicated in FIG. 9.

EXAMPLE 5

Preparation of Nitrogenated HA Foams

Several pieces of HA-derived foam prepared in Example 3 were immersed in a 30% $H_2O_2$-water solution for a period of 2-48 hours to obtain oxidized HA-derived foams, having a controlled oxygen content of 2-25% by weight.

Some oxidized HA-derived foam samples were mixed with different proportions of urea and the mixtures were heated in a microwave reactor (900 W) for 0.5 to 5 minutes. The products were washed several times with deionized water and vacuum dried. The products obtained were nitrogenated HA foam. The nitrogen contents were from 3% to 17.5 wt. %, as measured by elemental analysis.

Figure 7:
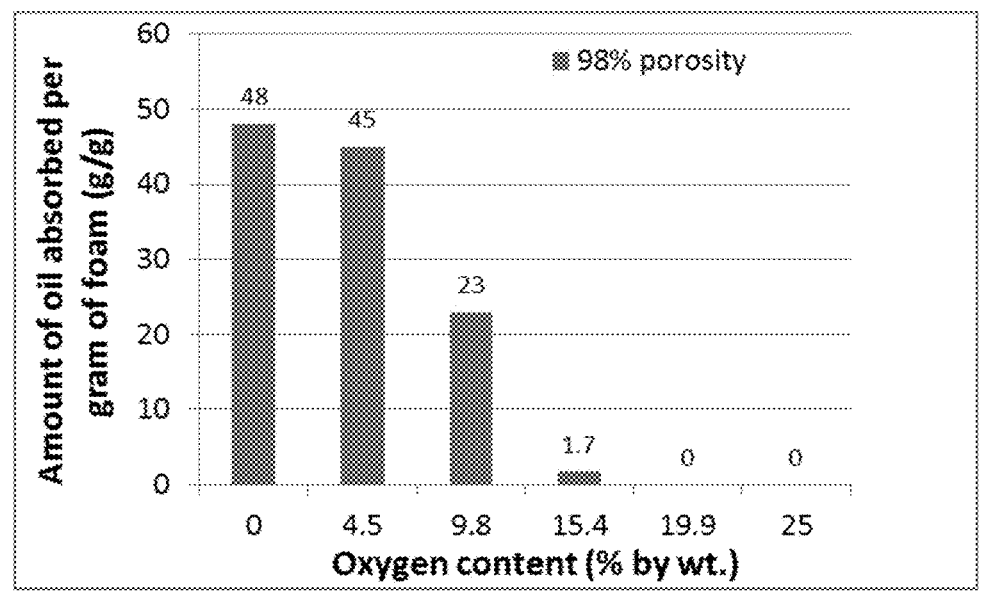
FIG. 7 The amount of oil absorbed per gram of HA-derived foam is plotted as a function of the oxygen content in the foam having a porosity level of approximately 98% (oil separation from oil-water mixture).
Figure 8:
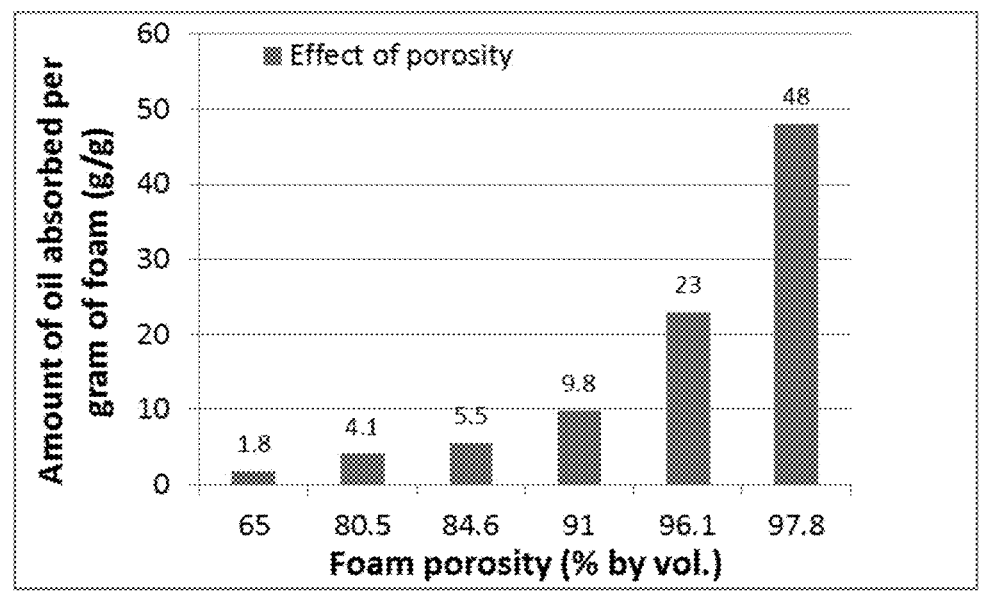
FIG. 8 The amount of oil absorbed per gram of integral HA-derived foam, plotted as a function of the porosity level (given the same oxygen content).

It may be noted that different functionalization treatments of the HA-derived foam were for different purposes. For instance, oxidized HA foam structures are particularly effective as an absorber of oil from an oil-water mixture (i.e. oil spilled on water and then mixed together), FIG. 7 and FIG. 8. In this case, the integral HA-derived foam structures (having 0-15% by wt. oxygen) are both hydrophobic and oleophilic (FIG. 7). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water.

Different contents of O, F, and/or N also enable the presently invented HA-derived foams to absorb different organic solvents from water, or to separate one organic solvent from a mixture of multiple solvents.

EXAMPLE 6

Characterization of Various Ha-derived Foams and Conventional Graphite Foam

The internal structures (crystal structure and orientation) of several series of HA-carbon foam materials were investigated using X-ray diffraction. The X-ray diffraction curve of natural graphite typically exhibits a peak at approximately 2θ=26°, corresponds to an inter-graphene spacing ($d_{002}$) of approximately 0.3345 nm. The RHA walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene-like planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphite single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our HA-derived foams have a mosaic spread value in this range of 0.3-0.6 when produced using a final heat treatment temperature no less than 2,500° C.

It is of significance to point out that a heat treatment temperature as low as 500° C. is sufficient to bring the average inter-planar spacing between hexagonal carbon atomic planes along the pore walls to below 0.4 nm, getting closer and closer to that of natural graphite or that of a graphite single crystal. The beauty of this approach is the notion that this HA suspension coating and heat treating strategy has enabled us to organize, orient/align, and chemically merge the planar HA molecules into a unified structure with all the graphene-like hexagonal carbon atomic planes now being larger in lateral dimensions (significantly larger than the length and width of the original HA molecules). A potential chemical linking and merging mechanism is illustrated in FIG. 3. This has given rise to exceptional thermal conductivity and electrical conductivity values.

In conclusion, we have successfully developed an absolutely new, novel, unexpected, and patently distinct class of HA foam or HA-derived graphitic foam materials and related processes of production. The chemical composition (% of oxygen, fluorine, and other non-carbon elements), structure (crystal perfection, grain size, defect population, etc), crystal orientation, morphology, process of production, and properties of this new class of foam materials are fundamentally different and patently distinct from mesophase pitch-derived graphite foam, CVD graphene-derived foam, and graphene foams from hydrothermal reduction of GO, and sacrificial bead template-assisted RGO foam. The thermal conductivity, electrical conductivity, elastic modulus, and flexural strength exhibited by the presently invented foam materials are much higher than those of prior art foam materials.

We claim:

1. A process for producing a humic acid-derived foam, said process comprising:
   (a) preparing a humic acid dispersion having multiple humic acid molecules or sheets dispersed in a liquid medium, wherein said humic acid is selected from a group consisting of fluorinated humic acid, chlorinated humic acid, brominated humic acid, iodized humic acid, and a combination thereof and wherein said humic acid has a content of non-carbon elements no less than 5% by weight and said dispersion contains a blowing agent having a blowing agent-to-humic acid weight ratio from 0/1.0 to 1.0/1.0;
   (b) dispensing and depositing said humic acid dispersion onto a surface of a supporting substrate to form a wet layer of humic acid;
   (c) partially or completely removing said liquid medium from the wet layer of humic acid to form a dried layer of humic acid; and
   (d) heat treating the dried layer of humic acid at a first heat treatment temperature from 80° C. to 3,200° C. at a desired heating rate sufficient to induce volatile gas molecules from said non-carbon elements or to activate said blowing agent for producing said humic acid-derived foam which is composed of multiple pores and pore walls and has a physical density from 0.005 to 1.7 g/cm$^3$ and a specific surface area from 50 to 3,200 m$^2$/g, wherein said pore walls contain single-layer or few-layer humic acid-derived hexagonal carbon atomic planes or sheets merged together in an edge-to-edge manner, said few-layer hexagonal carbon atomic planes or sheets have 2-10 layers of stacked hexagonal carbon atomic planes having an inter-plane spacing $d_{002}$ from 0.3354 nm to 0.60 nm as measured by X-ray diffraction, and said single-layer or few-layer hexagonal carbon atomic planes contain 0.01% to 25% by weight of non-carbon elements.

2. The process of claim 1, wherein said dispensing and depositing procedure includes subjecting said humic acid dispersion to an orientation-inducing stress.

3. The process of claim 1, further including a step of heat-treating the humic acid-derived foam at a second heat treatment temperature higher than said first heat treatment temperature for a length of time sufficient for obtaining a graphitic foam wherein said pore walls contain stacked hexagonal carbon atomic planes having an inter-planar spacing $d_{002}$ from 0.3354 nm to 0.36 nm and a content of non-carbon elements less than 2% by weight.

4. The process of claim 1, wherein said blowing agent is a physical blowing agent, a chemical blowing agent, a mixture thereof, a dissolution-and-leaching agent, or a mechanically introduced blowing agent.

5. The process of claim 1, which is a roll-to-roll process wherein said steps (b) and (c) include feeding said supporting substrate from a feeder roller to a deposition zone, continuously or intermittently depositing said humic acid dispersion onto said surface of said supporting substrate to form said wet layer of humic acid thereon, drying said wet layer of humic acid to form the dried layer of humic acid, and collecting said dried layer of humic acid deposited on said supporting substrate on a collector roller.

6. The process of claim 1, wherein said first heat treatment temperature is from 100° C. to 1,500° C.

7. The process of claim 3, wherein said second heat treatment temperature includes at least a temperature selected from the group consisting of (A) 300-1,500° C., (B) 1,500-2,100° C., and (C) 2,100-3,200° C.

8. The process of claim 3, wherein said second heat treatment temperature includes a temperature in the range of 300-1,500° C. for at least 1 hour and then a temperature in the range of 1,500-3,200° C. for at least 1 hour.

9. The process of claim 3, wherein said non-carbon elements include an element selected from the group consisting of oxygen, fluorine, chlorine, bromine, iodine, nitrogen, hydrogen, and boron.

10. The process of claim 3, wherein said a step of heat treating the dried layer of humic acid at said first heat treatment temperature is conducted under a compressive stress.

11. The process of claim 1, further comprising a compression step to reduce a thickness, a pore size, or a porosity level of said foam.

12. The process of claim 3, wherein said first and/or second heat treatment temperature contains a temperature in the range of 300° C.-1,500° C. and the foam has an oxygen content or non-carbon content less than 1%, and pore walls having an inter-planar spacing less than 0.35 nm, a thermal conductivity of at least 250 W/mK per unit of specific gravity, and/or an electrical conductivity no less than 2,500 S/cm per unit of specific gravity.

13. The process of claim 3, wherein said first and/or second heat treatment temperature contains a temperature in the range of 1,500° C.-2,100° C. and the foam has an oxygen content or non-carbon content less than 0.01%, pore walls having an inter-planar spacing less than 0.34 nm, a thermal conductivity of at least 300 W/mK per unit of specific gravity, and/or an electrical conductivity no less than 3,000 S/cm per unit of specific gravity.

14. The process of claim 3, wherein said first and/or second heat treatment temperature contains a temperature greater than 2,100° C. and the foam has an oxygen content or non-carbon content no greater than 0.001%, pore walls having an inter-planar spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

15. The process of claim 3, wherein said first and/or second heat treatment temperature contains a temperature no less than 2,500° C. and the foam has pore walls containing stacked hexagonal carbon planes having an inter-planar spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

16. The process of claim 1, wherein said humic acid-derived foam has a density from 0.005 to 1.7 $g/cm^3$, a specific surface area from 50 to 3,200 $m^2/g$, a thermal conductivity of at least 100 W/mK per unit of specific gravity, and/or an electrical conductivity no less than 500 S/cm per unit of specific gravity.

17. The process of claim 3, wherein said humic acid-derived foam has a density from 0.005 to 1.7 $g/cm^3$, a specific surface area from 50 to 3,200 $m^2/g$, a thermal conductivity of at least 100 W/mK per unit of specific gravity, and/or an electrical conductivity no less than 500 S/cm per unit of specific gravity.

18. A process for producing a fluorinated humic acid-derived foam, said process comprising:
(a) preparing a humic acid dispersion having multiple fluorinated humic acid molecules or sheets dispersed in a liquid medium, and wherein said dispersion contains an optional blowing agent having a blowing agent-to-fluorinated humic acid weight ratio from 0/1.0 o 1.0/1.0;
(b) dispensing and depositing said fluorinated humic acid dispersion onto a surface of a supporting substrate to form a wet layer of fluorinated humic acid;
(c) partially or completely removing said liquid medium from the wet layer of humic acid to form a dried layer of fluorinated humic acid; and
(d) heat treating the dried layer of fluorinated humic acid at a first heat treatment temperature from 80° C. to 3,200° C. at a desired heating rate sufficient to induce volatile gas molecules from non-carbon elements or to activate said blowing agent for producing said fluorinated humic acid-derived foam, which is composed of multiple pores and pore walls, wherein said pore walls contain single-layer or few-layer fluorinated humic acid-derived hexagonal carbon atomic planes or sheets merged together in an edge-to-edge manner, said few-layer hexagonal carbon atomic planes or sheets have 2-10 layers of stacked hexagonal carbon atomic planes having an inter-plane spacing $d_{002}$ from 0.3354 nm to 0.60 nm as measured by X-ray diffraction, and said single-layer or few-layer hexagonal carbon atomic planes contain 0.01% to 25% by weight of non-carbon elements.

* * * * *